United States Patent
Chueh et al.

(10) Patent No.: US 9,665,162 B2
(45) Date of Patent: May 30, 2017

(54) TOUCH INPUT DETERMINING METHOD WHICH CAN DETERMINE IF THE TOUCH INPUT IS VALID OR NOT VALID AND ELECTRONIC APPARATUS APPLYING THE METHOD

(71) Applicant: HTC Corporation, Taoyuan (TW)

(72) Inventors: Hsin-Ti Chueh, Taoyuan (TW); Chia-Wei Chen, Taoyuan (TW); Ssu-Po Chin, Taoyuan (TW); Abhishek Saxena, Taoyuan (TW); Sheng-Yang Pan, Taoyuan (TW); Chien-Lung Chou, Taoyuan (TW); Chun-Hao Fan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/604,758

(22) Filed: Jan. 26, 2015

(65) Prior Publication Data
US 2015/0277539 A1    Oct. 1, 2015

Related U.S. Application Data

(60) Provisional application No. 61/969,837, filed on Mar. 25, 2014.

(51) Int. Cl.
*G06F 1/32* (2006.01)
*G06F 3/041* (2006.01)

(52) U.S. Cl.
CPC .......... *G06F 1/3262* (2013.01); *G06F 1/3206* (2013.01); *G06F 3/0416* (2013.01)

(58) Field of Classification Search
USPC .............. 345/173–178; 178/18.01–20.01
See application file for complete search history.

(56) References Cited

U.S. PATENT DOCUMENTS

| 2005/0012723 A1* | 1/2005 | Pallakoff ............... G06F 1/1616 345/173 |
| 2006/0202969 A1* | 9/2006 | Hauck ................... G06F 3/0418 345/173 |
| 2010/0117961 A1* | 5/2010 | Westerman ......... G06F 3/03543 345/163 |

(Continued)

FOREIGN PATENT DOCUMENTS

| CN | 102713804 A | 10/2012 |
| TW | 201248491 A1 | 12/2012 |

OTHER PUBLICATIONS

Office action mailed on May 4, 2016 for the Taiwan application No. 104109084, filed Mar. 20, 2015, p. 1-14.

*Primary Examiner* — Chad Dicke
(74) *Attorney, Agent, or Firm* — Winston Hsu; Scott Margo

(57) ABSTRACT

A touch input determining method applied to an electronic apparatus with a touch sensing device, which comprises: (a) determining a size for a region of the touch sensing device that an object provides at least one touch input to; (b) if the size is larger than or equals to a first predetermined value, not determining the touch input is a valid touch input; and (c) if the size is smaller than or equals to a second predetermined value, not determining the touch input is a valid touch input, wherein the second predetermined value is smaller than the first predetermined value.

26 Claims, 23 Drawing Sheets

(56) References Cited

U.S. PATENT DOCUMENTS

| | | | | |
|---|---|---|---|---|
| 2011/0223973 A1* | 9/2011 | Li | G06F 3/0346 | 455/564 |
| 2012/0182238 A1* | 7/2012 | Lee | G06F 3/0418 | 345/173 |
| 2012/0280917 A1* | 11/2012 | Toksvig et al. | | 345/173 |
| 2012/0299856 A1* | 11/2012 | Hasui | G06F 3/0418 | 345/173 |
| 2013/0147770 A1* | 6/2013 | Dahl | G06F 1/3215 | 345/177 |
| 2013/0265276 A1* | 10/2013 | Obeidat | G06F 3/044 | 345/174 |
| 2013/0290761 A1* | 10/2013 | Moon | G06F 1/3215 | 713/323 |
| 2014/0165012 A1* | 6/2014 | Shen | G06F 9/4451 | 715/863 |
| 2014/0189584 A1* | 7/2014 | Weng | G06F 3/04883 | 715/808 |
| 2014/0189588 A1* | 7/2014 | Shuttleworth | G06F 3/0484 | 715/810 |
| 2014/0304636 A1* | 10/2014 | Boelter | G06F 3/04883 | 715/771 |
| 2014/0362009 A1* | 12/2014 | Lin | G06F 1/1694 | 345/173 |
| 2014/0368441 A1* | 12/2014 | Touloumtzis | G06F 3/017 | 345/173 |
| 2014/0372896 A1* | 12/2014 | Raman | G06F 3/0488 | 715/741 |

* cited by examiner (a)

(b)

(a)

(b)

TOUCH INPUT DETERMINING METHOD WHICH CAN DETERMINE IF THE TOUCH INPUT IS VALID OR NOT VALID AND ELECTRONIC APPARATUS APPLYING THE METHOD

CROSS REFERENCE TO RELATED APPLICATIONS

This application claims the benefit of U.S. Provisional Application No. 61/969,837, filed on Mar. 25, 2014, the contents of which are incorporated herein by reference.

BACKGROUND OF THE INVENTION

1. Field of the Invention

The present invention relates to a touch input determining method and an electronic apparatus applying the method, and particularly relates to a touch input determining method that can avoid wrongly triggering the electronic apparatus and can save power, and an electronic apparatus applying the method.

2. Description of the Prior Art

A conventional handheld electronic apparatus, such as a mobile phone or a tablet PC, can operate in a sleep mode or a normal mode. Whole functionality for the handheld electronic apparatus is provided if the handheld electronic apparatus operates in the normal mode. On the contrary, some of the devices in the handheld electronic apparatus are non-active or turned off in the sleep mode (ex. the display is off and the touch sensing device for the handheld electronic apparatus is non-active), such that the power consumption for the handheld electronic apparatus is low but the functionality is limited.

A hardware button such as a lock/unlock button is always provided on the handheld electronic apparatus, thereby a user can awake the handheld electronic apparatus from the sleep mode via pressing the lock/unlock button. However, the lock/unlock button has a limited pressing times, thus it is easily broken if the user needs to press the lock/unlock button to active the electronic apparatus.

Additionally, for some conventional handheld electronic apparatuses, they are still locked after the lock/unlock button is pressed thus the function thereof still can't work. The display for the handheld electronic apparatus is on after the user presses the lock/unlock button, and then the user needs to perform another gesture to unlock the handheld electronic apparatus. After that, the user must input a command, such as a tap or a gesture, to control the handheld electronic apparatus to perform a desired function. Therefore, more power consumption is needed, since the display must keep on before the desired function is performed.

Further, a conventional handheld electronic apparatus may wrongly determine a meaningless input as a valid touch input, such that the handheld electronic apparatus may be wrongly triggered.

Also, a conventional touch sensing device of the handheld electronic apparatus may calibrate the touch sensing level (i.e. the standard for determining if an object touches the touch sensing device or not) for each time that the touch sensing device is activated. However, such operation may consume much power.

SUMMARY OF THE INVENTION

Accordingly, one objective of the present application is to provide a touch input determining method and an electronic apparatus with a touch input determining mechanism, which can avoid wrongly determining a meaningless input as a valid touch input.

Another objective of the present application is to provide a touch input determining method and an electronic apparatus that can calibrate a touch sensing level of a touch sensing device according to a temperature of the touch sensing device.

One embodiment of the present invention discloses: A touch input determining method applied to an electronic apparatus with a touch sensing device, which comprises: (a) determining a size for a region of the touch sensing device that an object provides at least one touch input to; (b) if the size is larger than or equals to a first predetermined value, not determining the touch input is a valid touch input; and (c) if the size is smaller than or equals to a second predetermined value, not determining the touch input is a valid touch input, wherein the second predetermined value is smaller than the first predetermined value.

In one embodiment, the touch input determining method further comprises: detecting a temperature of the touch sensing device; and determining if the touch sensing device should activate with a calibration for a touch sensing level or not according to the temperature.

An electronic apparatus with a touch input determining mechanism can be acquired based on above-mentioned methods, which comprises a processing module configured to perform above-mentioned methods.

In view above-mentioned embodiments, meaningless inputs can be filtered thus the electronic apparatus will not be wrongly triggered. Further, the touch sensing level calibration can be triggered only when the temperature variation is large, thus the power can be saved.

These and other objectives of the present invention will no doubt become obvious to those of ordinary skill in the art after reading the following detailed description of the preferred embodiment that is illustrated in the various figures and drawings.

DETAILED DESCRIPTION

The concept for the present invention will be explained via following embodiments. Please note a mobile phone is taken for example for explaining, but it does not mean the present invention is limited to be applied to a mobile phone. The control method provided by the present invention can be applied to any other electronic apparatus. Also, please note in the following embodiments, a touch screen, which can be regarded as an electronic apparatus comprising a touch sensing device and a display integrated together, is applied as an example. Therefore, in the following description, if a display is mentioned, it mentions the display of the touch screen. If a touch sensing device is mentioned, it mentions the touch sensing device integrated to the touch screen. However, please note the electronic apparatus according to the present invention can comprise a display and a touch sensing device independent from each other.

Figure 1:
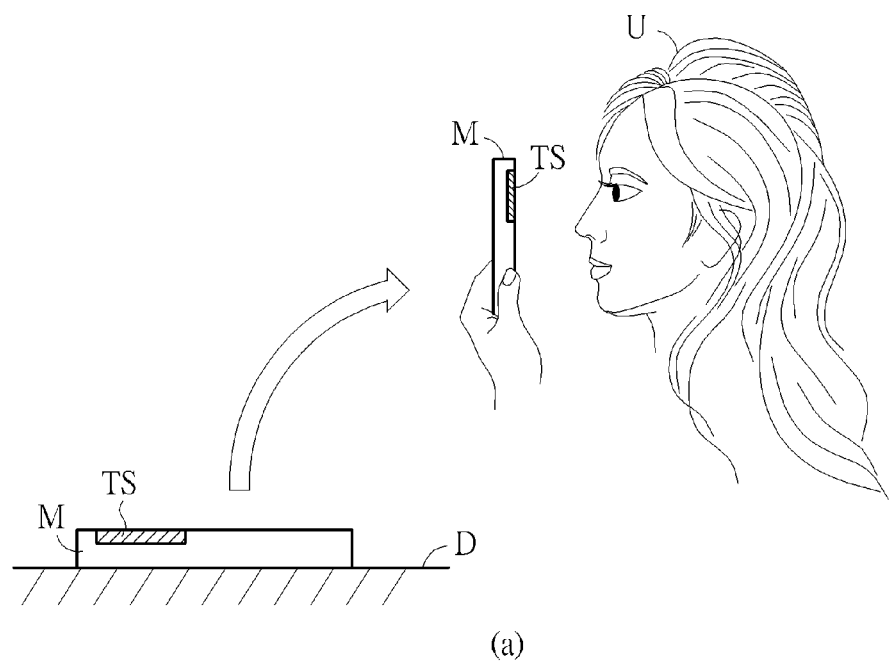
FIG. 1 is a schematic diagram illustrating an example for how the method for controlling an electronic apparatus according to one embodiment of the present invention works.
Figure 1:
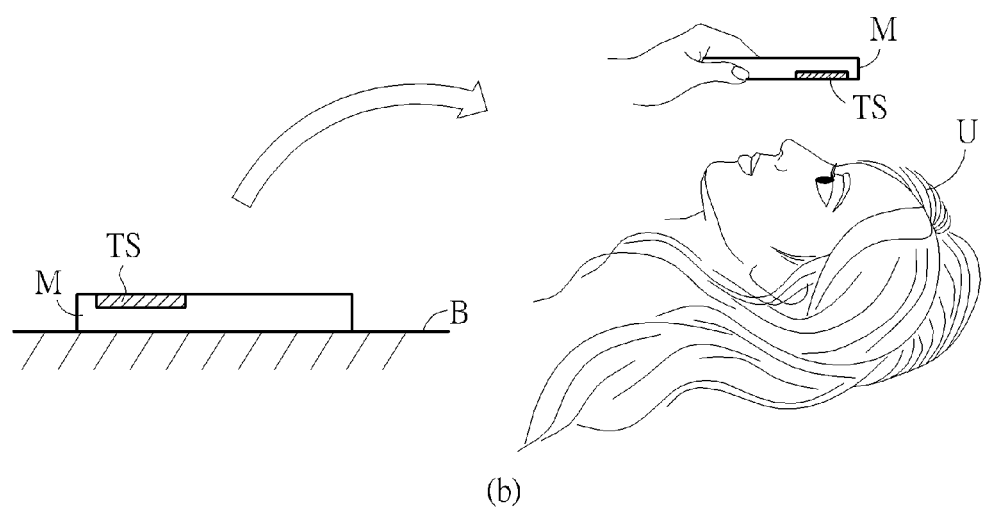

FIG. 1 is a schematic diagram illustrating an example for how the method for controlling an electronic apparatus according to one embodiment of the present invention works. As shown in FIG. (a) of FIG. 1, if the mobile phone M with a touch screen TS originally lays on a desk D, operates in a sleep mode, and a user U, who is standing or sitting, takes the mobile phone M from the desk D, a tilt angle of the mobile phone M is sensed. Alternatively, as shown in FIG. (b) of FIG. 1, if the mobile phone M originally lays on a bed B, operates in a sleep mode and a user U, who is laying down on the bed B, takes the mobile phone M from the bed D, a tilt angle of the mobile phone M is also sensed. In the sleep mode, the display is off. In one embodiment, the touch sensing device is non-active in the sleep mode, or the touch sensing device is active but the data it sensed is ignored. No matter which circumstance does the touch sensing device operates in, the mobile phone M does not respond the touch control operation applied to the touch sensing device in the sleep mode. After the tilt angle is sensed, the tile angle is determined if it falls in a predetermined angle range. If yes, a user input from an input device of the mobile phone M is sensed, while the display is off. A predetermined function is performed based on the user input, with the display is on or the display is off.

Figure 2:
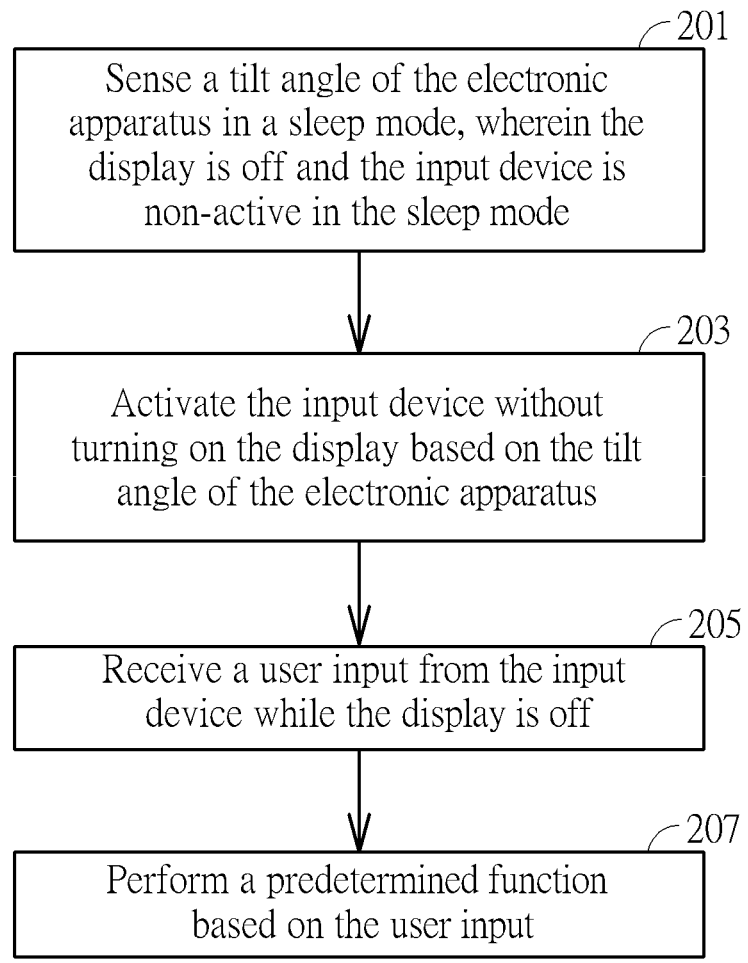
FIG. 2 is a flow chart illustrating a method for controlling an electronic apparatus according to one embodiment of the present invention.

The above-mentioned operation can be illustrated as the steps shown in FIG. 2, which is a flow chart illustrating a method for controlling an electronic apparatus according to one embodiment of the present invention. FIG. 2 comprises the following steps:

Step 201

Sense a tilt angle of the electronic apparatus in a sleep mode, wherein the display is off and the input device is non-active in the sleep mode.

Step 203

Activate the input device without turning on the display based on the tilt angle of the electronic apparatus.

Step 205

Receive a user input from the input device while the display is off.

Step 207

Perform a predetermined function based on the user input.

Figure 3:
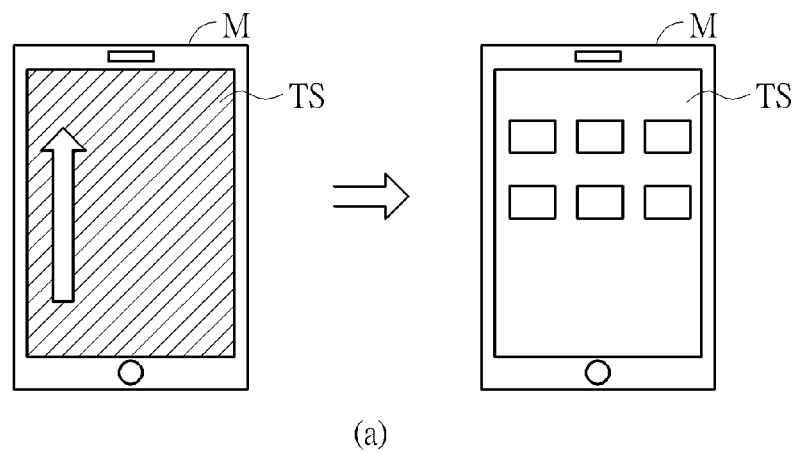
FIG. 3 is a schematic diagram illustrating the example that the user input is a gesture.
Figure 3:
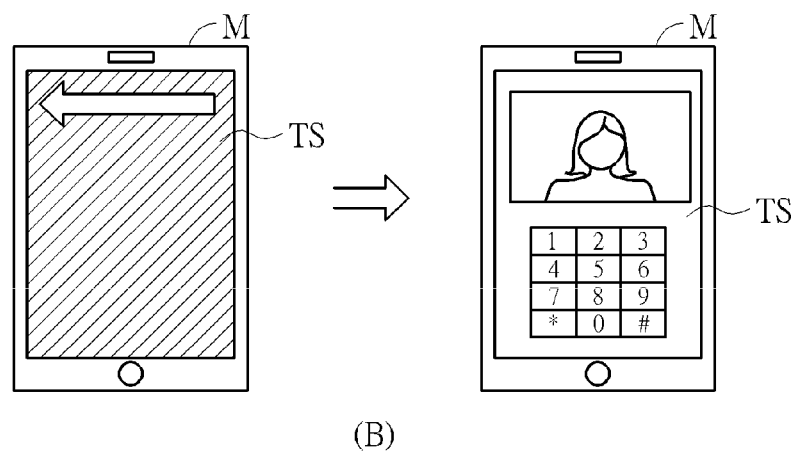
Figure 3:
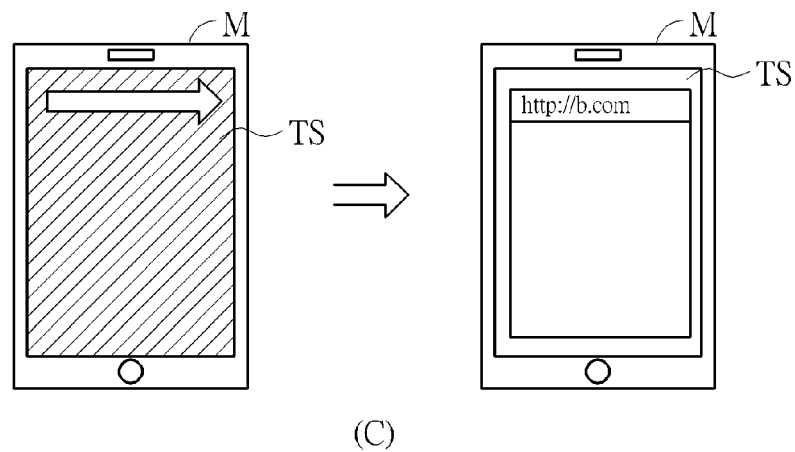

In one embodiment, the input device is a touch sensing device, and the user input is a gesture. If the user input meets a predetermined gesture, the mobile phone M performs a predetermined function. FIG. 3 is a schematic diagram illustrating the case that the user input is a gesture. Please note, the display is still off while receiving the user input. As shown in FIG. (a) of FIG. 3, if the user slides from down to up on the touch screen TS, the display is turned on, and the mobile phone M backs to a home scene. As shown in FIG. (b) of FIG. 3, if the user slides from right to left on the touch screen TS, the display is turned on, the mobile phone M launches a dialer program. Additionally, as shown in FIG. (c) of FIG. 3, if the user slides from left to right on the touch screen TS, the display is turned on, the mobile phone M launches a web browser program. Furthermore, in another embodiment not illustrated here, if the user continuously taps the touch screen TS for two times, only the display is turned on and no other function is performed. Please note the predetermined function is not limited to comprising turning on the display. For example, the predetermined function can be playing music while the display is off.

Figure 4:
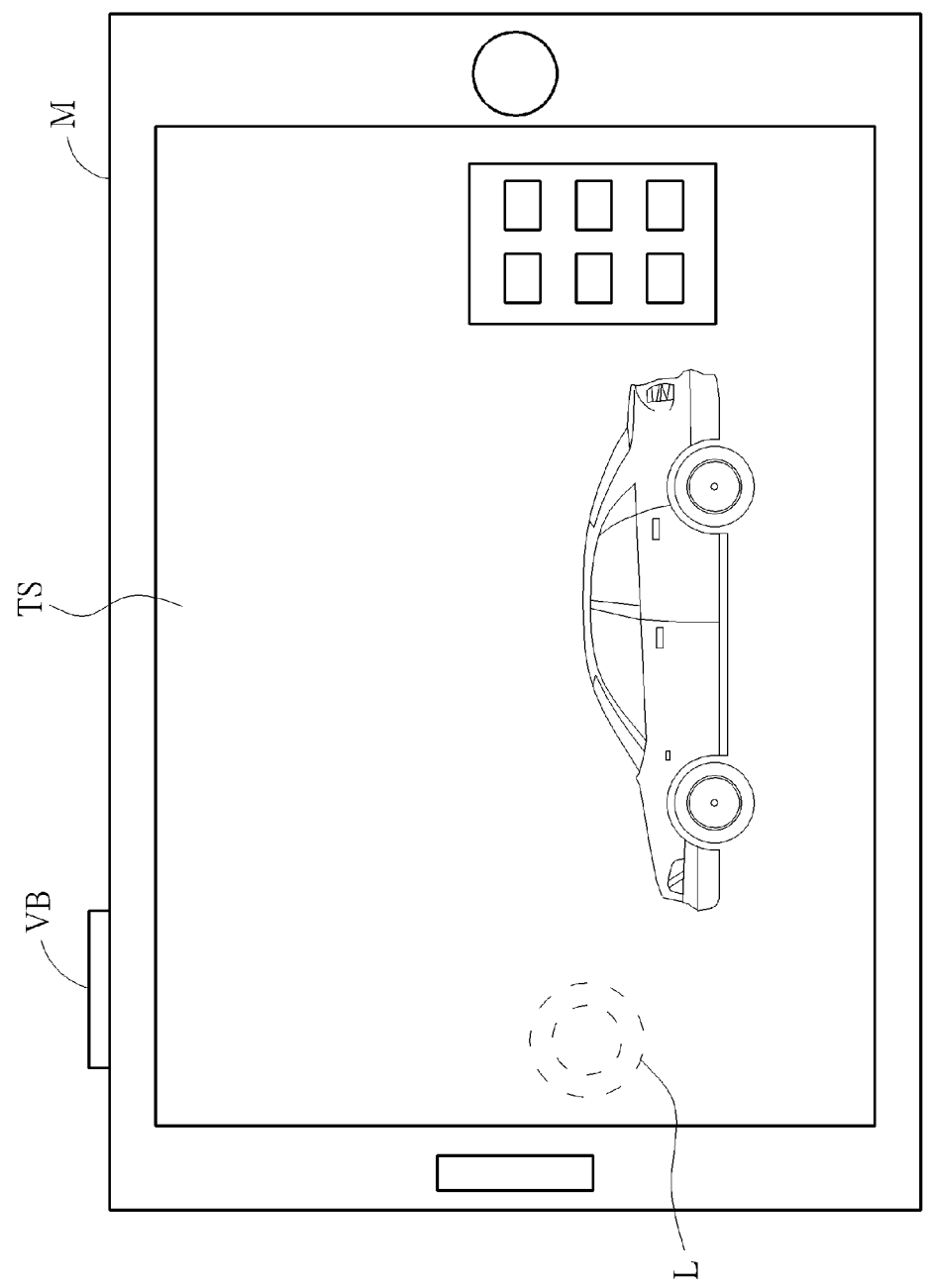
FIG. 4 is a schematic diagram illustrating the example that the user input is from a hardware button.

In another embodiment, the input device is a hardware button provided on the mobile phone M, for example, a hardware button for controlling a volume of the mobile phone M. FIG. 4 is a schematic diagram illustrating the case that the user input is from a hardware button (ex. pressing or pushing). As shown in FIG. 4, the mobile phone M comprises a camera and a hardware button VB for controlling a voice of the mobile phone M. The camera has a lens L provided at a back of the mobile phone M. If the hardware button VB is pressed or pushed, the display is turned on and a camera function (the predetermined function) is activated. Please note the mobile phone M is in a landscape mode in this example, but it can be in a portrait mode. Additionally, the hardware button VB can be a button for controlling other parameters of the mobile phone M, for example, the brightness of the touch screen TS. Additionally, the function activated by the activating applied to the hardware button is not limited to the camera function. Via this mechanism, the user can use different hardware buttons to active the electronic apparatus to perform the predetermined function, thus the breaking for the hardware button due to pressing too frequently can be avoided.

Figure 5:
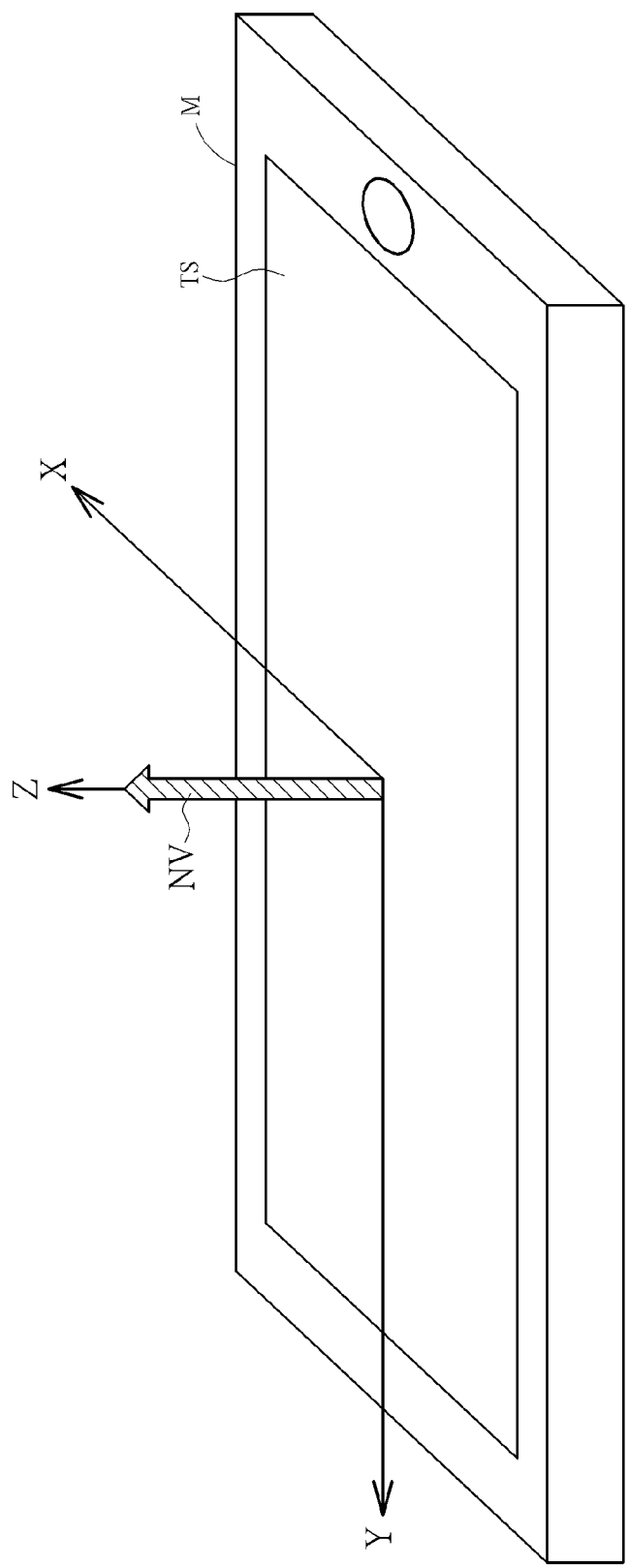
FIG. 5 is a schematic diagram illustrating the operation for sensing the tilt angle via a G-sensor, according to one embodiment of the present invention.

Various kinds of methods can be applied to sense the tile angle of the mobile phone M, and one of them is using a G-sensor. FIG. 5 is a schematic diagram illustrating the operation for sensing the tilt angle via a G-sensor, according to one embodiment of the present invention. As shown in FIG. 5, the normal vector NV of the touch screen TS has an x component, a y component and a z component. Therefore, the direction of the normal vector NV can be acquired via sensing the x component, the y component and the z component, thereby the tilt angle for the mobile phone M can be acquired.

In one embodiment, a G-sensor is applied to sense the normal vector, therefore values pitch, roll and azimuth related with the x component, the y component and the z component can be acquired. In such embodiment, if the pitch is between 0°~85° and the roll is between −30°~30°, activating the touch sensing device. In another embodiment, if the pitch is between 95°~150° and the roll is between −150°~+180°, activating the touch sensing device. In another embodiment, if the pitch is between 85°~95°, activating the touch sensing device (in such case, the roll value can be ignored). However, the operation illustrated in FIG. 5 is not limited to be performed by a G-sensor.

Figure 6:
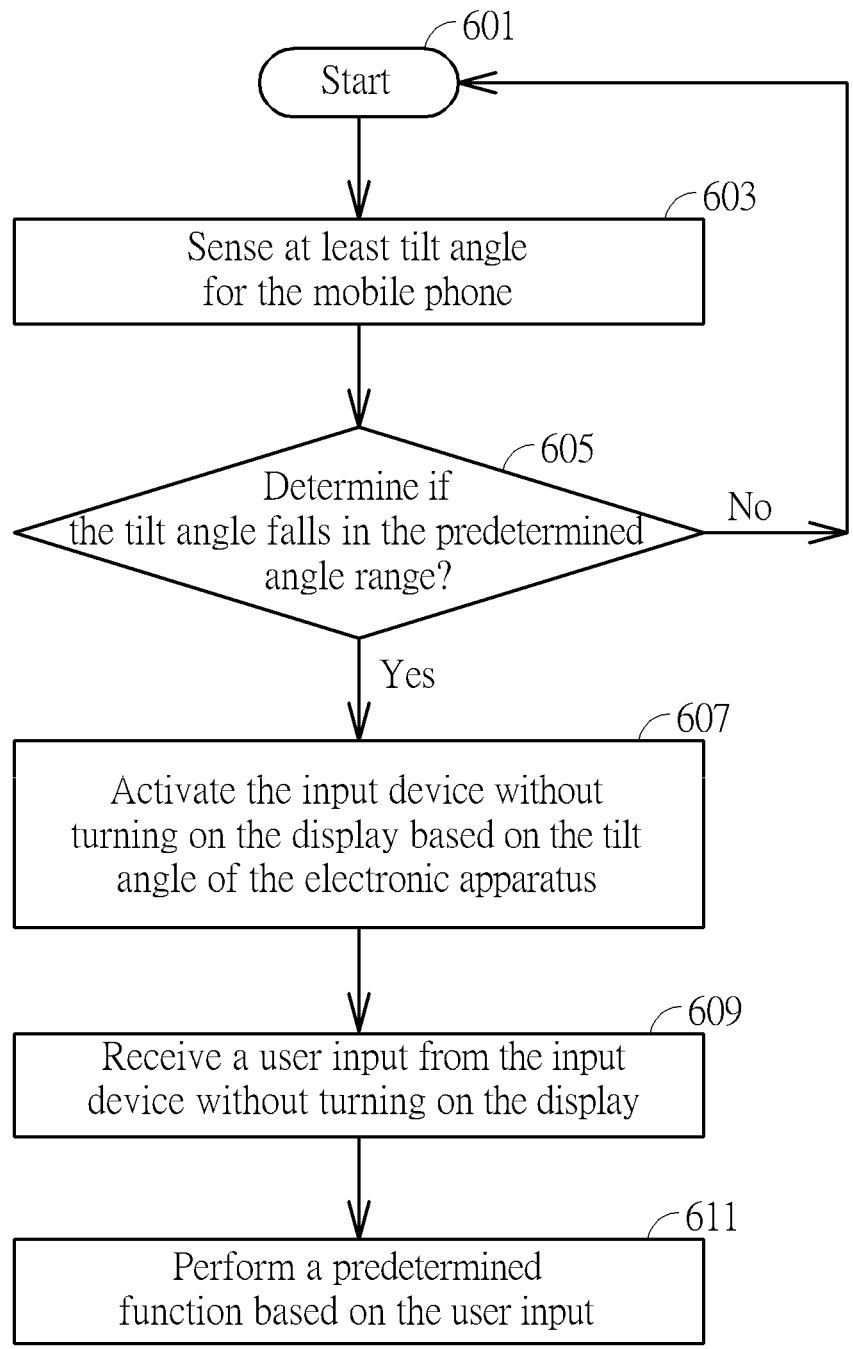
FIG. 6 is a flow chart illustrating more detail steps for a method for controlling an electronic apparatus according to one embodiment of the present invention.

FIG. 6 is a flow chart illustrating the steps for a method for controlling an electronic apparatus according to one embodiment of the present invention. As shown in FIG. 6, the method for controlling an electronic apparatus comprises the following steps:

Step 601

Start.

Step 603

Sense at least tilt angle for the mobile phone.

Please note there are various methods to start the step 603. In one embodiment, if the mobile phone M is originally in a stable situation (ex. kept flat on a desk or on a bed) and it is moved, the sensing for the tilt angle starts. The sensing for the tilt angle can be continuously performed even if the mobile phone M operates in the sleep mode. Such variation should also fall in the scope of the present invention.

Step 605

Determine if the tilt angle falls in the predetermined angle range. If yes, go to step 607, if not, go back to the step 601.

Step 607

Activate the input device without turning on the display based on the tilt angle of the electronic apparatus.

The tilt angle can be regarded as an environment parameter. In one embodiment, other environment parameters generated according to the environment surrounding the mobile phone M, such as speed, acceleration, brightness, moisture, can be further referred to determine if the input device should be activated.

Step 609

Receive a user input from the input device while the display is off.

In one embodiment, the input device is a touch sensing device which is activated for a predetermined period of time, thus the user input is determined to check if it matches a predetermined gesture in the predetermined period of time. In another embodiment, if no user input is received in the predetermined period of time, it goes back to the step 601 after the predetermined period of time. In still another embodiment, the input device is not limited to a touch sensing device and if no user input is sensed during the predetermined period of time, it goes back to the step 501 after the predetermined period of time.

Step 611

Perform a predetermined function based on the user input.

Figure 7:
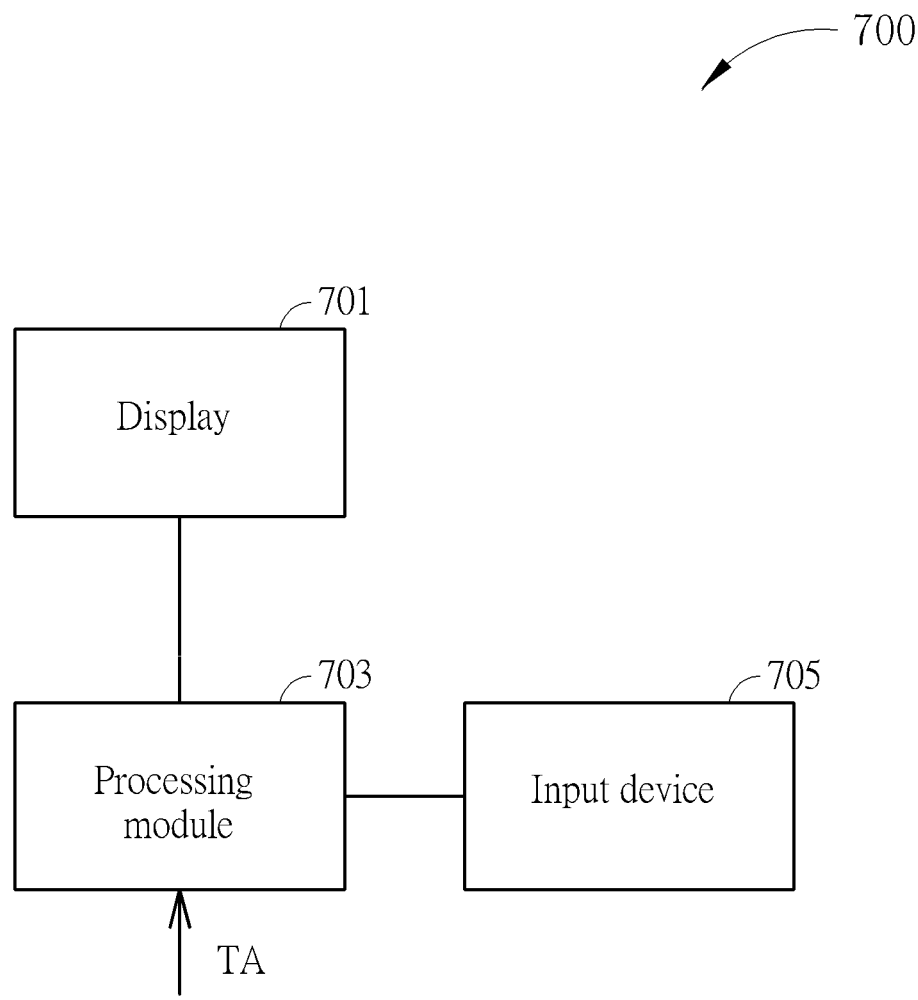
FIG. 7 is a block diagrams illustrating electronic apparatuses according to one embodiment of the present invention.

The above-mentioned methods can be applied to electronic apparatuses below. FIG. 7 is a block diagrams illustrating electronic apparatuses according to one embodiment of the present invention. AS shown in FIG. 7, the electronic apparatuses comprises: a display 701, a processing module 703, and an input device 705. The display is off and the input device 705 is non-active in the sleep mode. The processing module 703 connected to the display 701, the input device 705, and configured to: activate the input device 705 without turning on the display 701 based on a tilt angle TA of the electronic apparatus 700, receive a user input from the input device 705 while the display is off; and control the electronic apparatus 700 to perform a predetermined function based on the user input (ex. the examples in FIG. 3 and FIG. 4).

Figure 8:
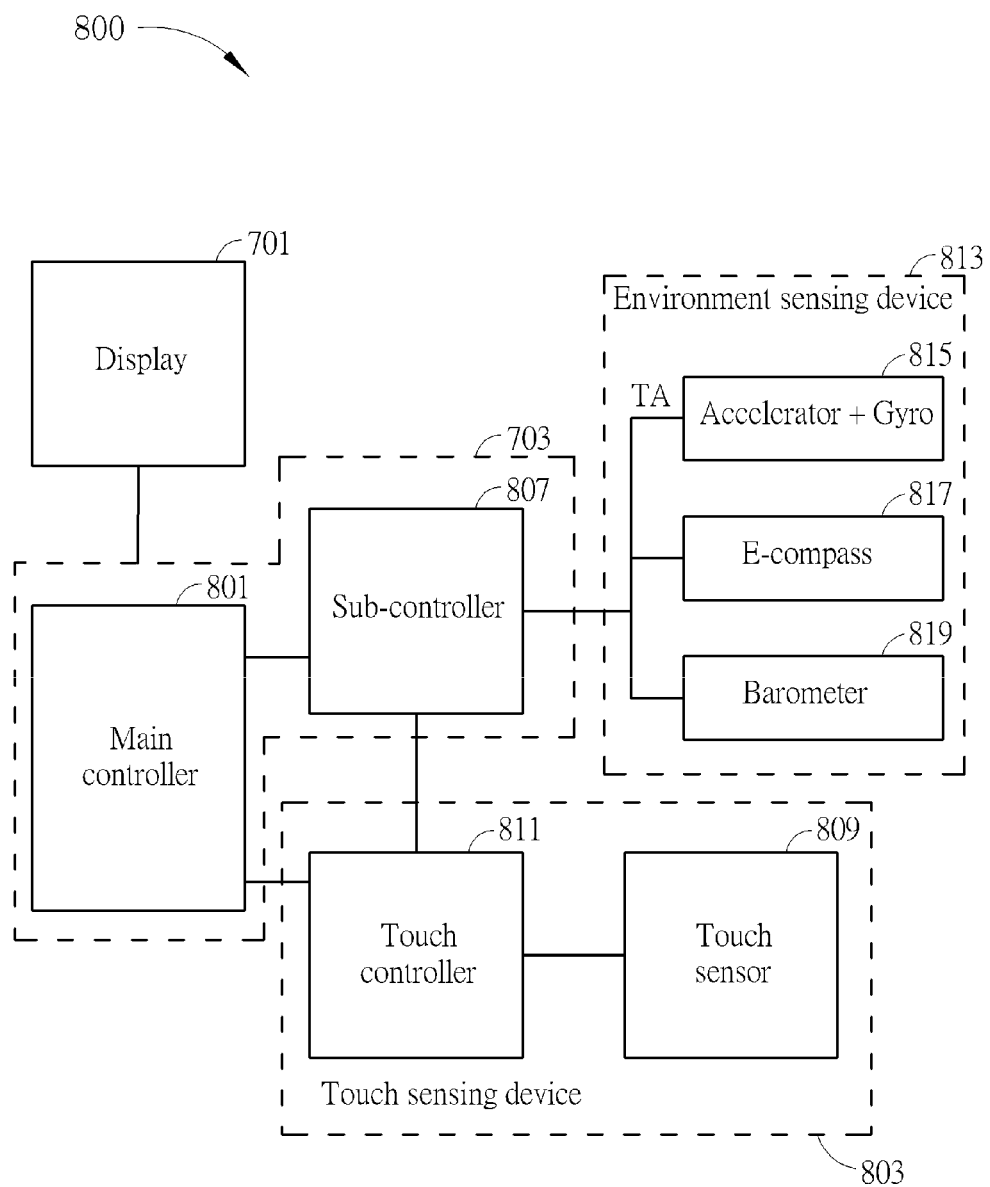
FIG. 8-FIG. 9 are block diagrams illustrating more detail blocks for electronic apparatuses according to different embodiments of the present invention.

FIG. 8 is a block diagram illustrating more detail blocks for the electronic apparatus according to one embodiment of the present invention. As shown in FIG. 8, the electronic apparatus 800 (ex. the above-mentioned mobile phone M), which can be another kind of electronic apparatus, comprises a main controller 801 (ex. a CPU), a touch sensing device 803, a G-sensor 815, and a sub-controller 807. Please note the above-mentioned processing module 703 can comprise the main controller 801 and the sub-controller 807, as shown in FIG. 8. The G-sensor 815 senses a tilt angle TA of the electronic apparatus 800 in a sleep mode, as shown in FIG. 1. The display 701 (ex. the abovementioned touch screen TS) is off and the input device (a touch sensing device 803 in this example, such as the abovementioned touch screen TS) is non-active in the sleep mode. Please note, the main controller 801 and the sub-controller 807 can be physically independent controllers. Or, the function thereof can be performed via executing different programs via a single processor.

The sub-controller 807 is activate in the sleep mode, for activating the touch sensing device 803 without turning on the display based on the tilt angle of the electronic apparatus 800. The touch sensing device 803 senses a user input (ex. the gesture in FIG. 4) from an input device while the display is off, after activated by the sub-controller 807 based on the tilt angle of the electronic apparatus 800. The sub-controller 807 actives the main controller 801 to control the electronic apparatus 800 to perform a first predetermined function (ex. the operation in FIG. 3 and FIG. 4) based on the user input. In one embodiment, the touch sensing device 803 comprises a touch sensor 809 and a touch controller 811. In such case either the sub-controller 807 or the touch controller 811 can receive the user input.

The G-sensor can be regarded as an environment parameter, as above-mentioned, in one embodiment, other environment parameters generated according to the environment surrounding the mobile phone M, such as speed, acceleration, brightness, moisture, can be further referred to determine if the operation for activating the input device should be performed. Therefore, the electronic apparatus 800 can further comprise an environment sensing device 813, which can comprise at least one of: a G-sensor 805, an E-compass 817 and a barometer 819. Please note the environment sensing device 813 is not limited to comprise the devices illustrated in FIG. 8.

As above-mentioned, in one embodiment, the input device (i.e. the touch sensing device) is activated for a predetermined period of time, thus the operation for sensing the control operation is performed in the predetermined period of time. In order to perform such operation, the electronic apparatus 800 can comprise a timer (ex. a counter), which can be implemented by software such as a program executed by the sub-controller or a hardware independent from other devices. The timer can continuously count to tell the sub-controller the counting value (the time), or just tells the sub-controller the counting value when it reaches the predetermine period of time. Additionally, the timer can be reset if the sub-controller receives any user input. Or, the timer can be reset only the user input meets a predetermined gesture. Timer is to control the time of enabling input device. Such variation or combination should fall in the scope of the present invention.

Figure 9:
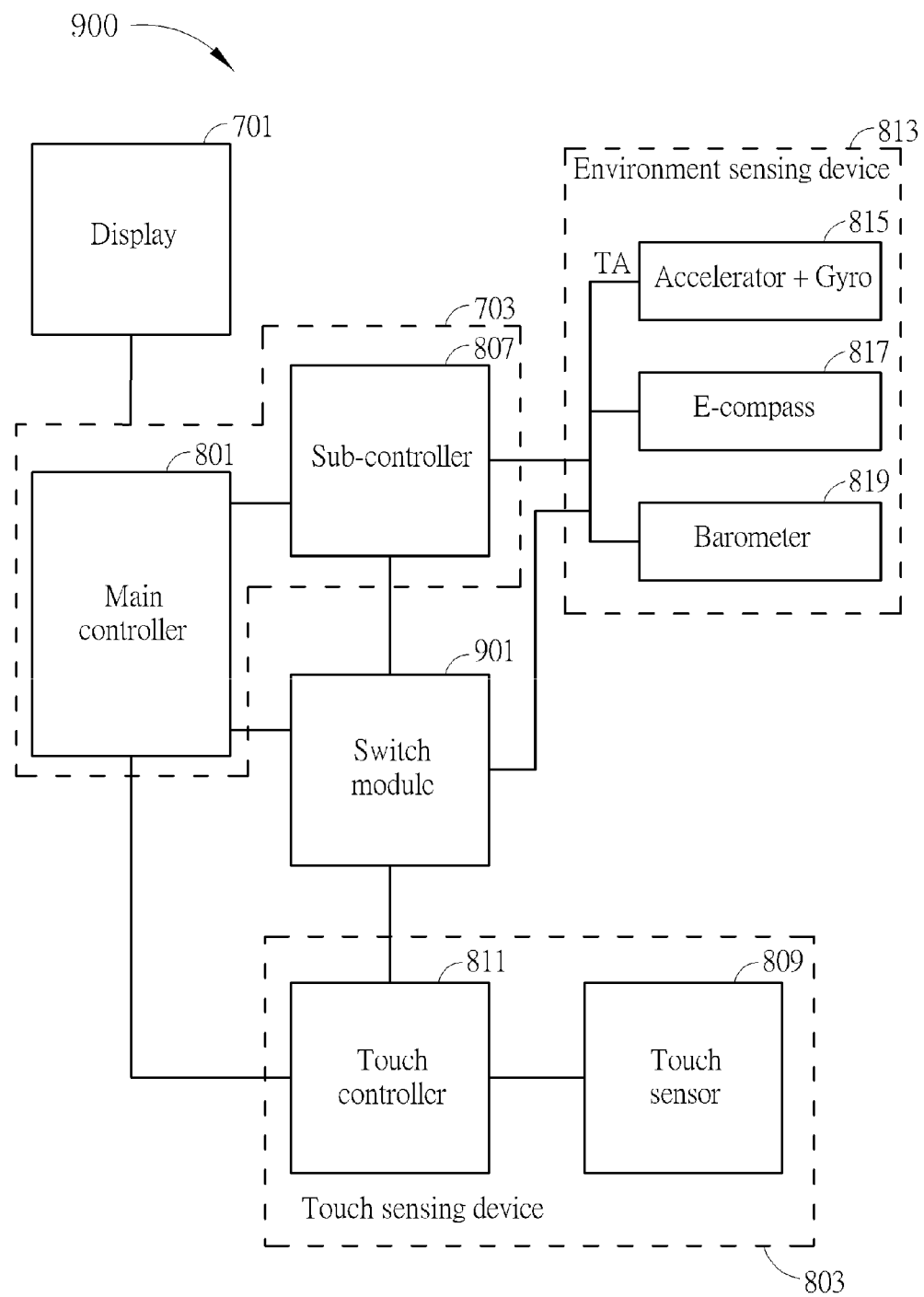

FIG. 9 is a block diagram illustrating an electronic apparatus 900 according to one embodiment of the present invention. Comparing with the electronic apparatus 800, the electronic apparatus 900 further comprises a switch module 901, which can comprise at least one switch device such as a multiplexer or a multiplexer. The switch module 901 is applied to select a preferable data transmitting path. For example, if the touch controller 811 receives the user input, the switch module 901 does not need to work. However, if the sub-controller 807 receives the user input, data about the user input is transmitted to the sub-controller 807 via the switch module 901. The existence of switch module 901 can cause other benefit besides selecting a preferable data transmitting path, for example, the pins for the each device can be saved. For more detail, each device is included in an IC comprising limited pins. If the switch module 901 does not exist, each IC must arrange their pins to other devices, such that different data paths can be formed. However, if the switch module 901 is provided, the pins for each device can be saved since each device can be coupled to the switch module 901 via one pin to form different data paths.

Figure 10:
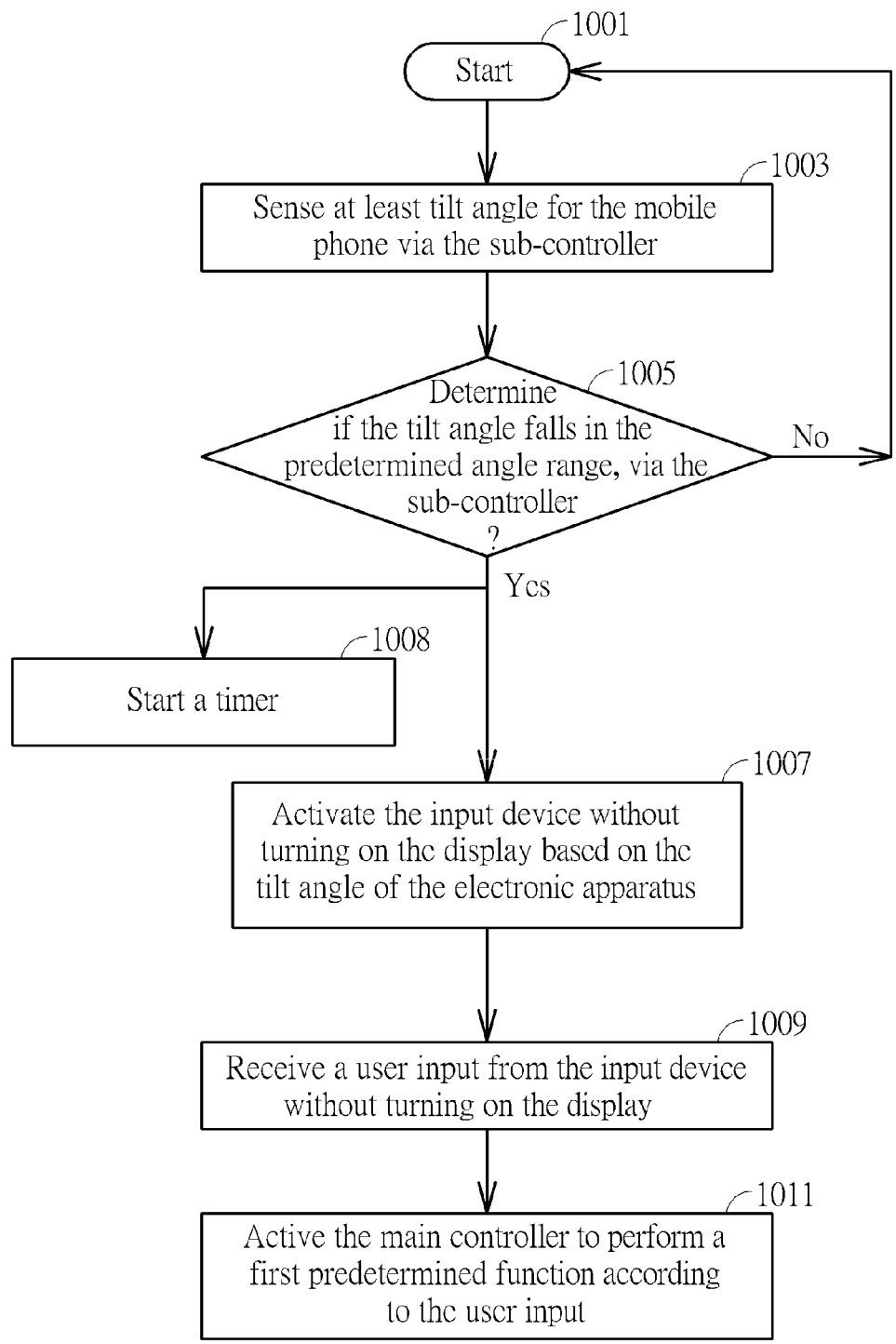
FIG. 10 is a flow chart illustrating the steps for a method for controlling an electronic apparatus according to another embodiment of the present invention.

FIG. 10 is a flow chart illustrating the steps for a method for controlling an electronic apparatus according to another embodiment of the present invention. The method in FIG. 10 comprises the following steps:

Step 1001

Start.

Step 1003

Sense at least tilt angle for the mobile phone via the sub-controller.

Please note there are various methods to start the step 1003. In one embodiment, if the mobile phone M is originally in a stable situation (ex. kept flat on a desk or on a bed) and it is moved, the sensing for the tilt angle starts. The sensing for the tilt angle can be continuously performed even if the mobile phone M operates in the sleep mode. Such variation should also fall in the scope of the present invention.

Step 1005

Determine if the tilt angle falls in the predetermined angle range, via the sub-controller. If yes, go to step 1007, if not, go back to the step 1001.

Step 1007

Activate the input device without turning on the display based on the tilt angle of the electronic apparatus Please refer to explanation about the steps 605, 607, the method for controlling an electronic apparatus provided by the present invention is not limited to determine if the tilt angle falls in the predetermined angle range, it can also start the sensing for the control operation based on other values of the tilt angle. Therefore, steps 1005 and 1007 can be summarized as: activating the touch sensing device without turning on the display based on the tilt angle of the electronic apparatus, via the sub-controller.

Step 1009

Receive a user input from the input device while the display is off.

As stated in the explanation about the step 609, in one embodiment, the input device is a touch sensing device which is activated for a predetermined period of time, thus the user input is determined to check if it matches a predetermined gesture in the predetermined period of time. In another embodiment, if no user input matching the predetermined gesture is received in the predetermined period of time, it goes back to the step 1001 after the predetermined period of time. In still another embodiment, the input device is not limited to a touch sensing device and if no user input meets a predetermined gesture is sensed during the predetermined period of time, it goes back to the step 1001 after the predetermined period of time. Therefore, the method in the step 1009 can further comprise a step 1008 to start a timer. The function of the timer has been illustrated in above-mentioned description, thus it is omitted for brevity here.

Step 1011

Active the main controller to perform a first predetermined function according to the user input.

All above-mentioned methods can be performed via executing a program recorded in a computer readable media, but not limited.

Besides the above-mentioned embodiments, in one embodiment, the input device is a touch sensing device and kept to be active, via the main controller or the sub-controller, for a predetermined period of time immediately after the display is turned off (ex. after the display is turned off but before enters the sleep mode). A user input from the input device is received while the display is off during this predetermined period of time, via the main controller or the sub-controller. Also, a predetermined function is performed based on the second user input. In another embodiment, the electronic apparatus is controlled to enter the sleep mode after the predetermined period of time, via the main controller or the sub-controller, when none of the second user input which is determined to meet the predetermined gesture is received from the input device during the predetermined period of time.

In still another embodiment, the input device is not limited to a touch sensing device and kept to be active for a predetermined period of time immediately, via the main controller or the sub-controller, after the display is turned off (ex. after the display is turned off but before enters the sleep mode). A user input from the input device is received without, via the main controller or the sub-controller, turning on the display during this predetermined period of time. The electronic apparatus is controlled to enter the sleep mode, via the main controller or the sub-controller, after the predetermined period of time, when no user input is received from the input device during the predetermined period of time.

Please refer to FIG. 6 again. The step 607 states: Activate the input device without turning on the display based on the tilt angle of the electronic apparatus. Also, the step 609 states: Receive a user input from the input device while the display is off. However, some errors easily occur if the electronic apparatus receives the user input without turning on the display, such that the electronic apparatus may be wrongly to perform an unexpected function. For example, if the user puts the electronic apparatus into a pocket and walk into a meeting room, the electronic apparatus may wrongly determines a gesture is performed thereon since the electronic apparatus rubs against the trouser. In such case the undesired function such as video/audio function may be triggered, thus some embarrassing situation may occur. Therefore a protection mechanism is needed.

In the following embodiment, the input device is a touch sensing device.

Figure 11:
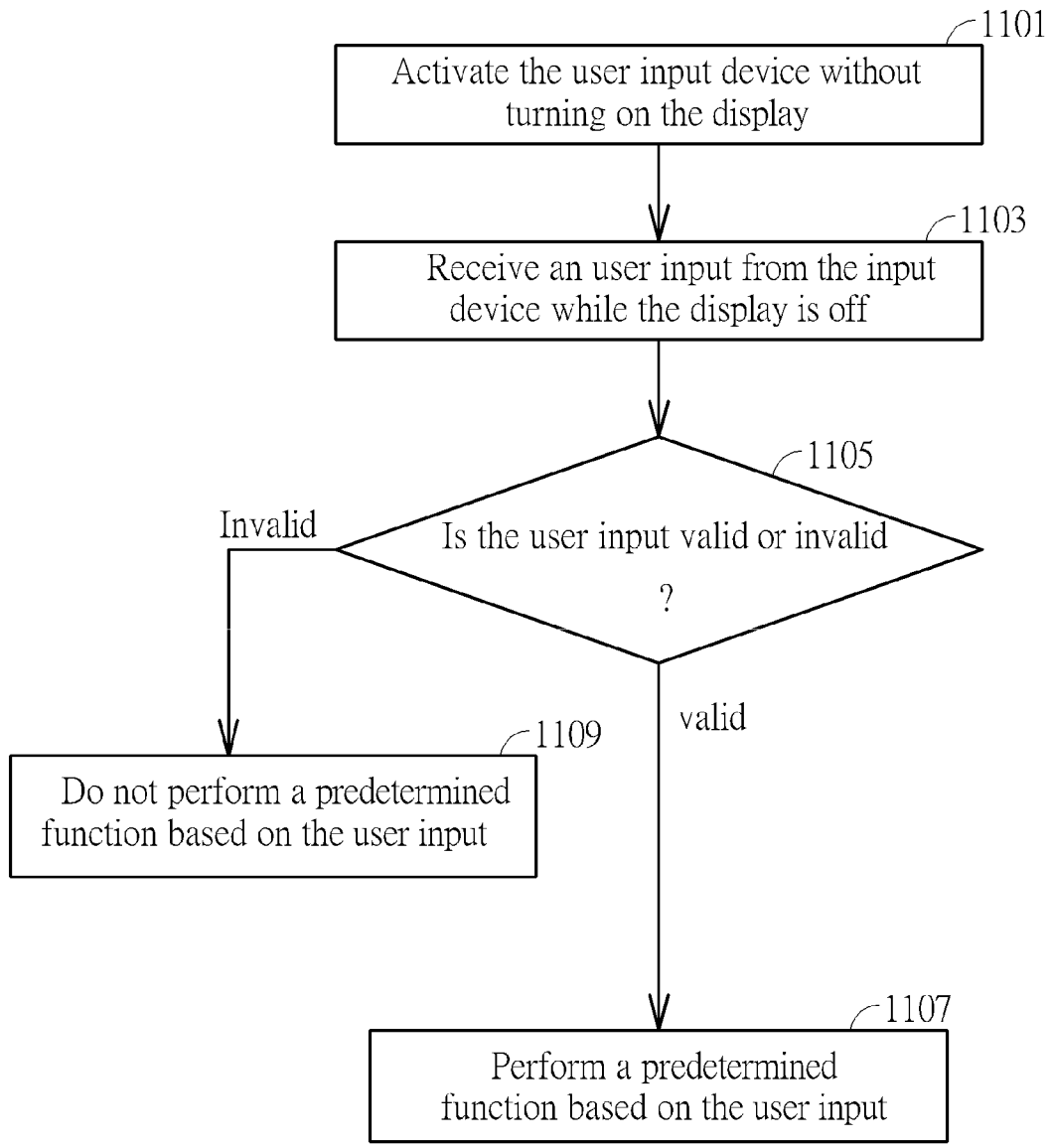
FIG. 11 is a flow chart illustrating a method for controlling an electronic apparatus, according to one embodiment of the present invention.

FIG. 11 is a flow chart illustrating a method for controlling an electronic apparatus, according to one embodiment of the present invention. In the following embodiments, a mobile phone is taken as an example for explaining, but the following embodiments can be applied to other electronic apparatuses. As shown in FIG. 11, the method for controlling an electronic apparatus in FIG. 11 comprises:

Step 1101

Activate the input device without turning on the display. In one embodiment, the input device is activated according to the tilt angle of the electronic apparatus, such as the step 607 in FIG. 6, but not limited.

Step 1103

Receive a user input from the input device while the display is off, such as the step 609. The user input here is not limited to the input generated from human but indicates any user input that detected by the input device. In the following embodiments, the user input is a touch input, the touch input may be a single touch or a multi touch and the input device is a touch sensing device (ex. the above-mentioned touch screen), but not limited.

Step 1105

Determine if the user input is valid or invalid? If valid, go to step 1107, if invalid, go to step 1109.

Step 1107

Perform a predetermined function based on the user input, such as the step 611.

Step 1109

Do not perform a predetermined function based on the user input. In one embodiment, the user input is ignored such that no predetermined function is performed accordingly.

Please note, the steps 1101-1105 can be regarded as a touch input determining method.

Many methods can be applied to determine the user input is valid or invalid, which will be described as below. In the following embodiments, if the user input is regarded as invalid, it is ignored. However, it is not limited.

For example, a P sensor can be provided to detect if the mobile phone is in the pocket or not. If the mobile phone is determined to be in the pocket due to receiving a near event from the P sensor, all touch inputs performed to the electronic apparatus are determined to be invalid and thus ignored.

Figure 12:
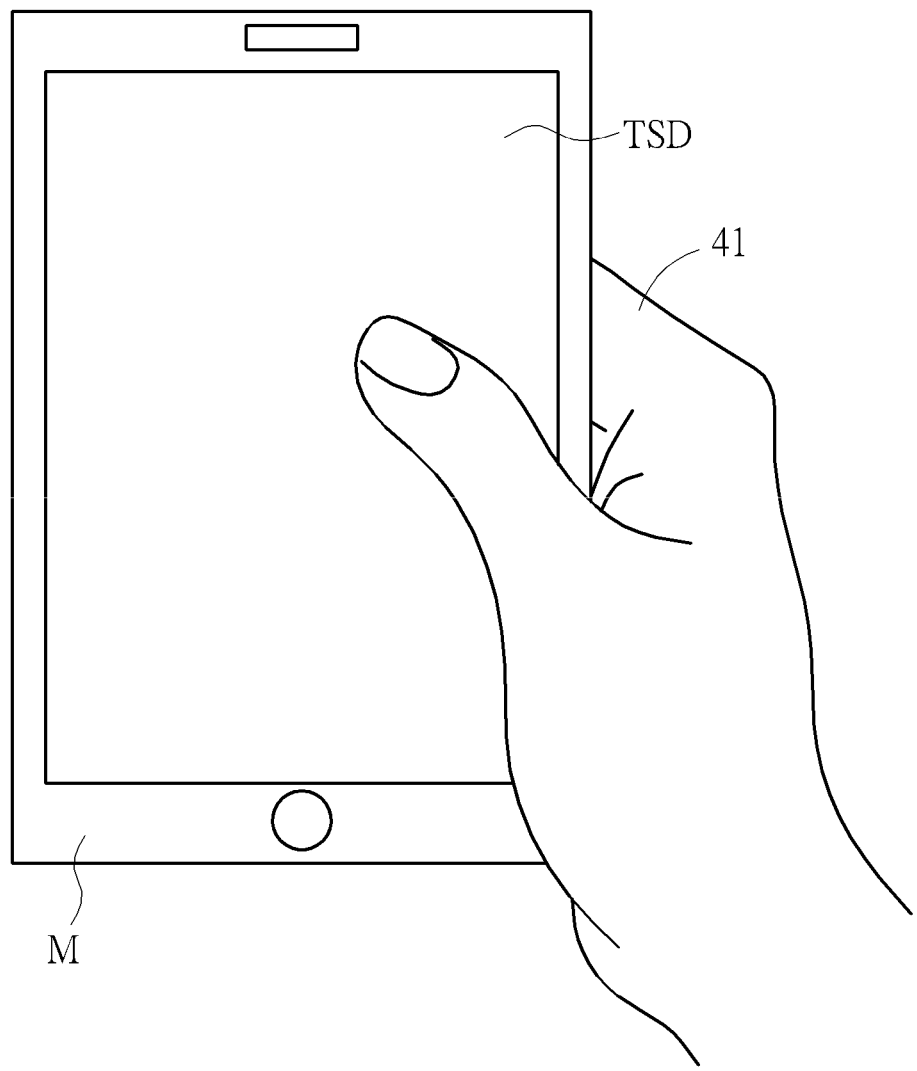
FIG. 12-FIG. 20 are schematic diagrams illustrating the examples for invalid the user input

For another example, a touch input detected by the input device is determined to be a palm touch input or not. If yes, the touch input is determined to be invalid and thus ignored. For example, as shown in FIG. 12, while a palm touching the electronic apparatus M, the touch input corresponding to the palm could be ignored since the user may just hold an electronic apparatus M and does not tend to provide any gesture to the electronic apparatus M. Many methods can be applied to determine whether a touch input is a palm touch input or not. For example, determining whether a touch input is a palm touch input can be based on at least one of the x, y, z components of the position of the touch input. In one example, the touch input is determined to be a palm touch input if the x, y components of the position of the touch input fall in a predetermined range. In another example, the touch input is determined to be a palm touch input if the x, y, Z components of the position of the touch input fall in a predetermined range. In another example, the touch input is determined to be a palm touch input if the Z component of the position of the touch input falls in a predetermined range. For another example, determining whether a touch input is a palm touch input can be based on a touch region size of the touch input. In one example, the touch input is determined to be a palm touch input if the touch region size of the touch input is larger than a predefined touch region threshold (i.e. a predetermined value).

For another example, a touch input detected by the input device is determined to be a sharp object touch input (e.g., such as a key or a coin) or not. If yes, the touch input is determined to be invalid and thus ignored. Many methods can be applied to determine whether a touch input is a sharp object touch input or not. For example, determining whether a touch input is a palm touch input can be based on a touch region size of the touch input. In one example, the touch input is determined to be a sharp object touch input if the touch region size of the touch input is smaller than another predefined touch region threshold (i.e. a predetermined value).

Figure 13:
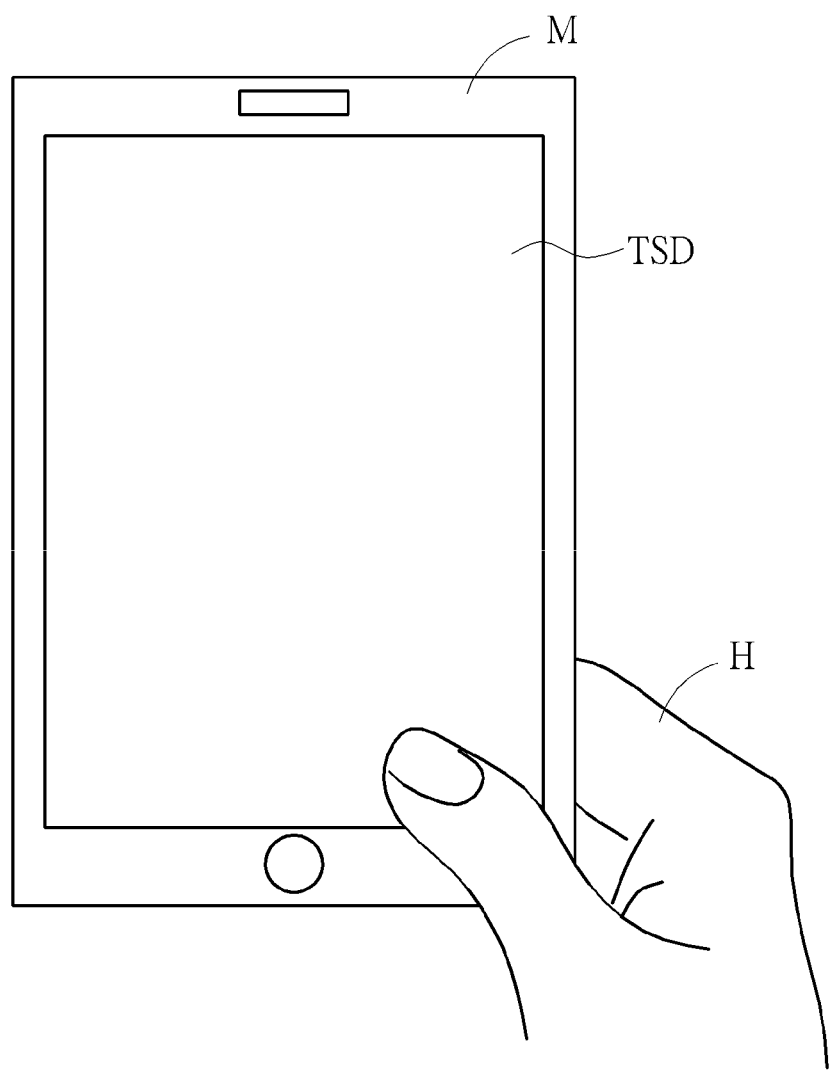
Figure 14:
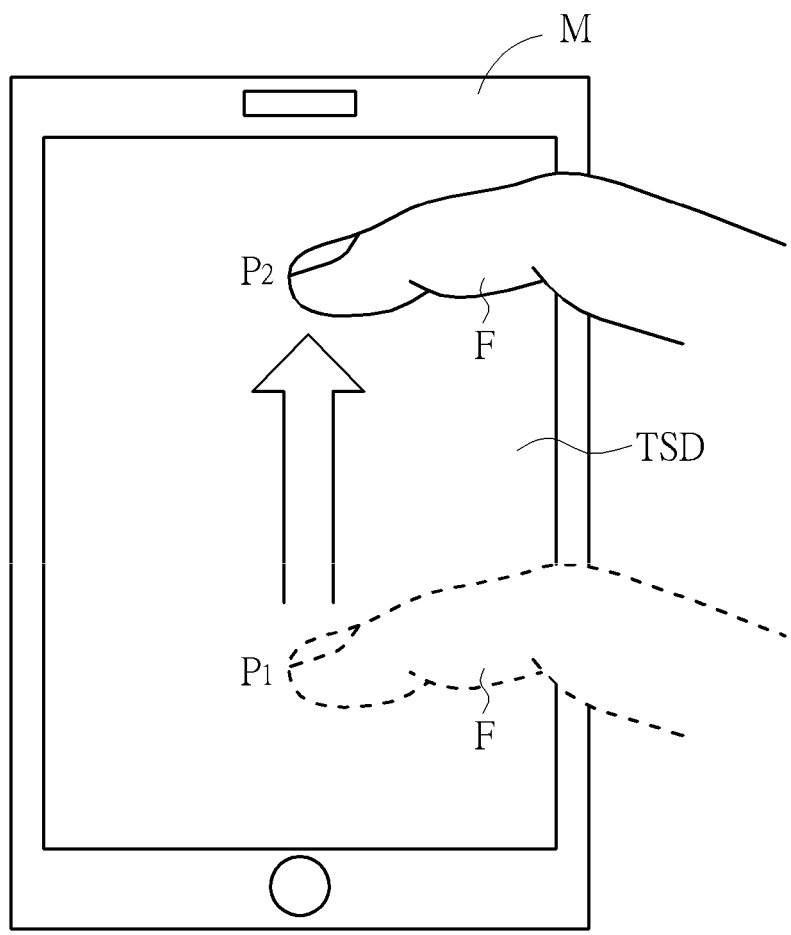

For another example, the touch input is determined to be in a timeout situation, which means a total touch time period of the touch input is longer than a predetermined time period. If yes, the touch input is determined to be invalid and thus ignored. For example, the user is holding a mobile phone M via the hand H and a finger F touches a touch sensing device TSD of the mobile phone M, as shown in FIG. 13. In one example, a touch input corresponding to the finger F is determined to be a timeout situation and thus ignored if the total touch time period of the touch input corresponding to the finger F is longer than a predetermined time period. Another example for the timeout situation is shown in FIG. 14. In this example, the finger F swipes from the position P1 to the position P2 of the touch sensing device TSD of the mobile phone M. In one example, a touch input corresponding to the finger F is determined to be a timeout situation and thus ignored if the total touch time period of the touch input corresponding to the finger F (from P1 to P2) is more than a predetermined time period (i.e. a predetermined value).

In another example, a touch input corresponding to the finger F is determined to be a timeout situation and thus ignored if the touch time period of staying at P2 is more than another predetermined time period. In yet another example for the timeout situation (not illustrated here), the user touches the touch sensing device TSD of the mobile phone for more than one time by a finger. In one example, the touch input corresponding to the multi touch is determined to be a timeout situation and thus ignored if the touch time period of the last touch is longer than a predetermined time period. In another example, the touch input corresponding to the multi touch is determined to be a timeout situation and thus ignored if the touch time interval between any two adjacent touches of the multi touch is longer than a predetermined time interval.

Figure 15:
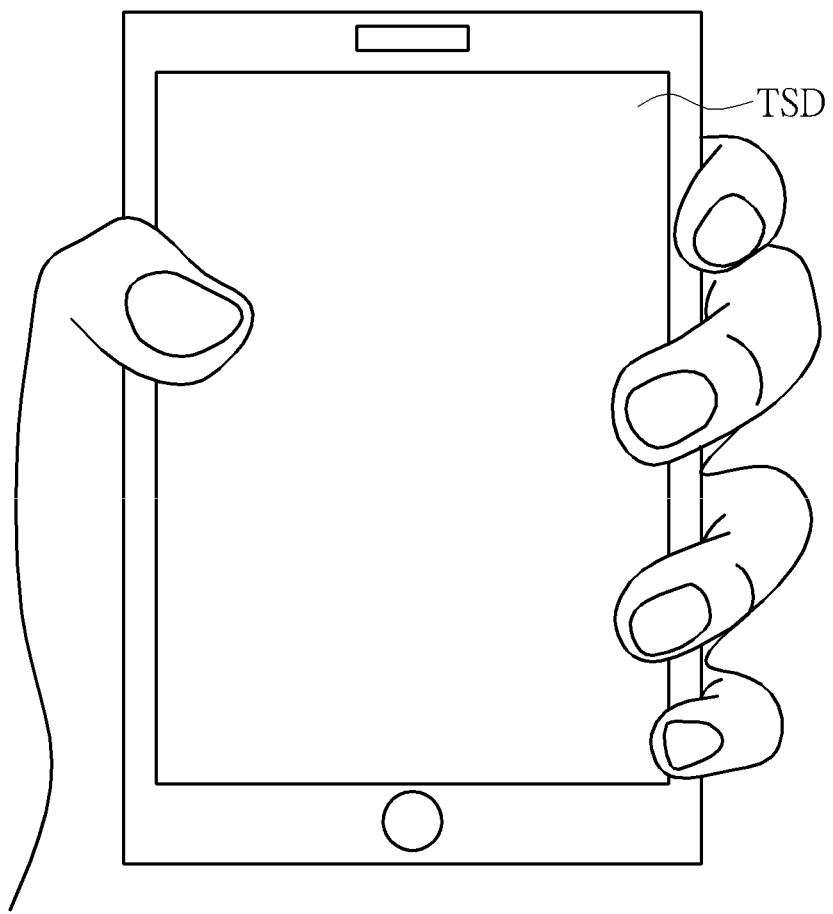
Figure 16:
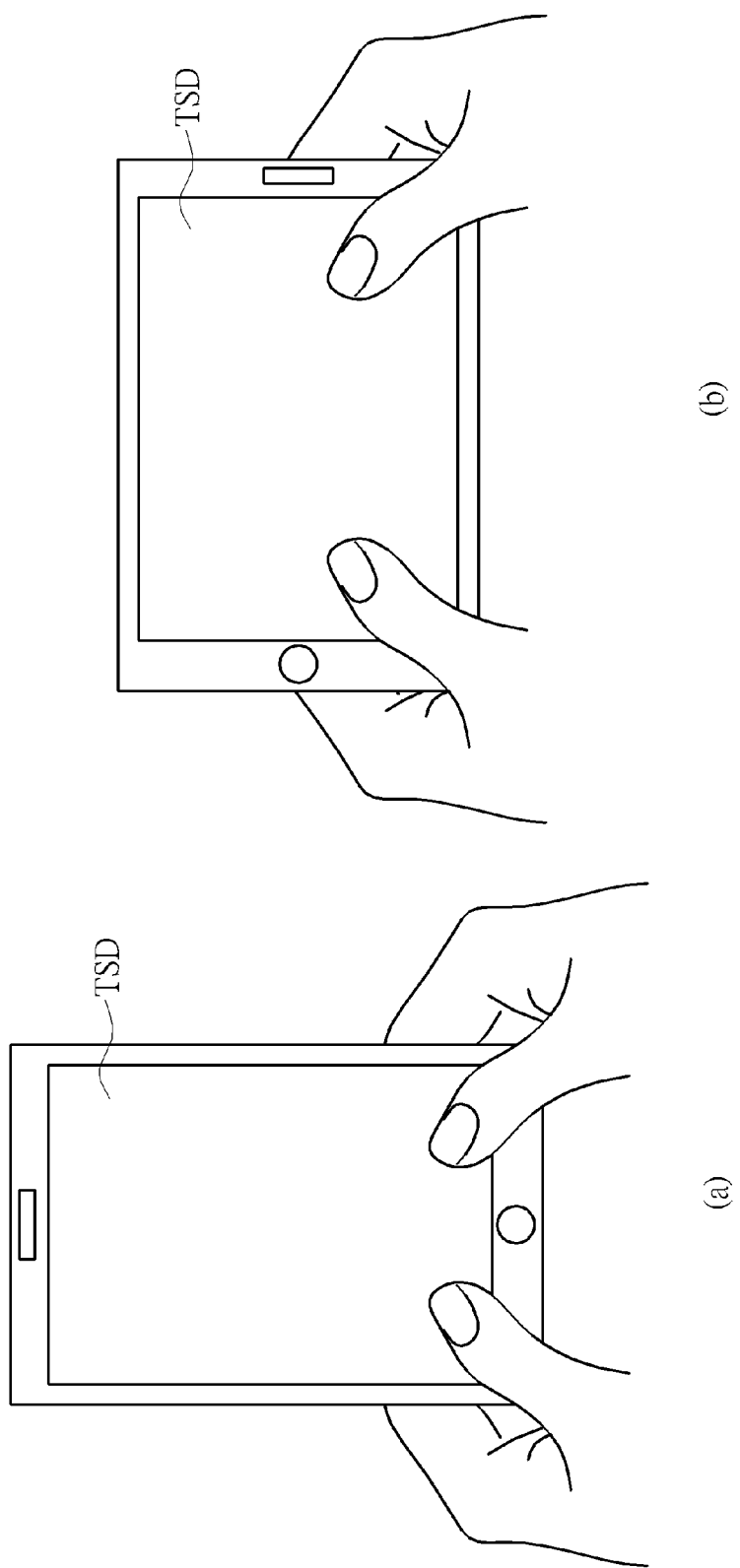
Figure 17:
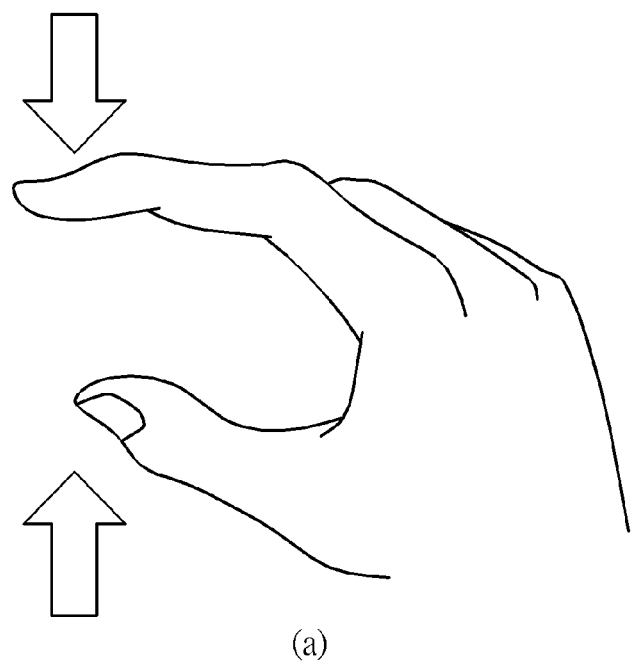
Figure 17:
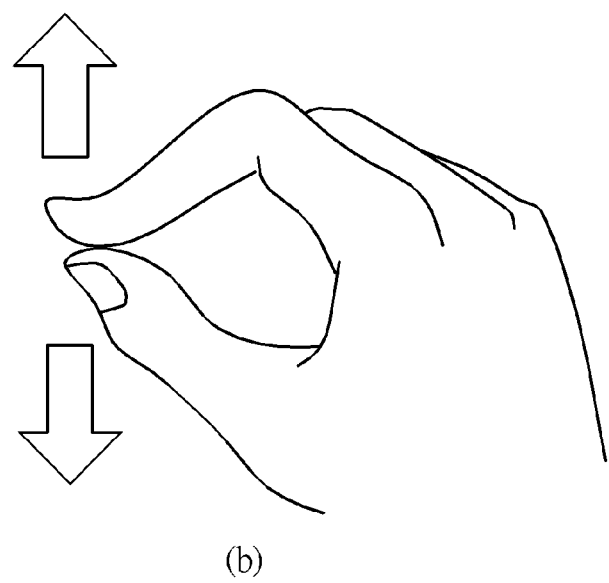

For another example, determining whether a touch input is valid or invalid is based on the number of touches for the touch input detected by the input device simultaneously. The touch input is determined to be invalid and thus ignored if the number of touches for the touch input detected by the input device simultaneously is larger than three. The advantage for the threshold number (i.e. a predetermined value) "three" is, for example, the user may always control the mobile phone via two fingers, as shown in FIG. 16(*a*), FIG. 16(*b*), FIG. 17(*a*) and FIG. 17(*b*). Or, the user may hold the mobile phone (a touch input is detected) and controls the mobile phone via a finger (another touch input is detected). Additionally, the user may hold the mobile phone with one hand (two touch points are detected), and user another hand to control the mobile phone (one touch point is detected). However, if the touch input is more than three, the mobile phone may be under the situation that the user holds it, as shown in FIG. 15. Accordingly, set the threshold "three" can avoid undesired touch input, but the user can still smoothly control the mobile phone.

For yet another example, the user touches the touch sensing device TSD of the mobile phone for more than one time by a finger. In one example, the touch input corresponding to the multi touch is determined to invalid and thus ignored if the distance between any two adjacent touches of the multi touch is greater than a distance threshold (i.e. a predetermined value).

Figure 18:
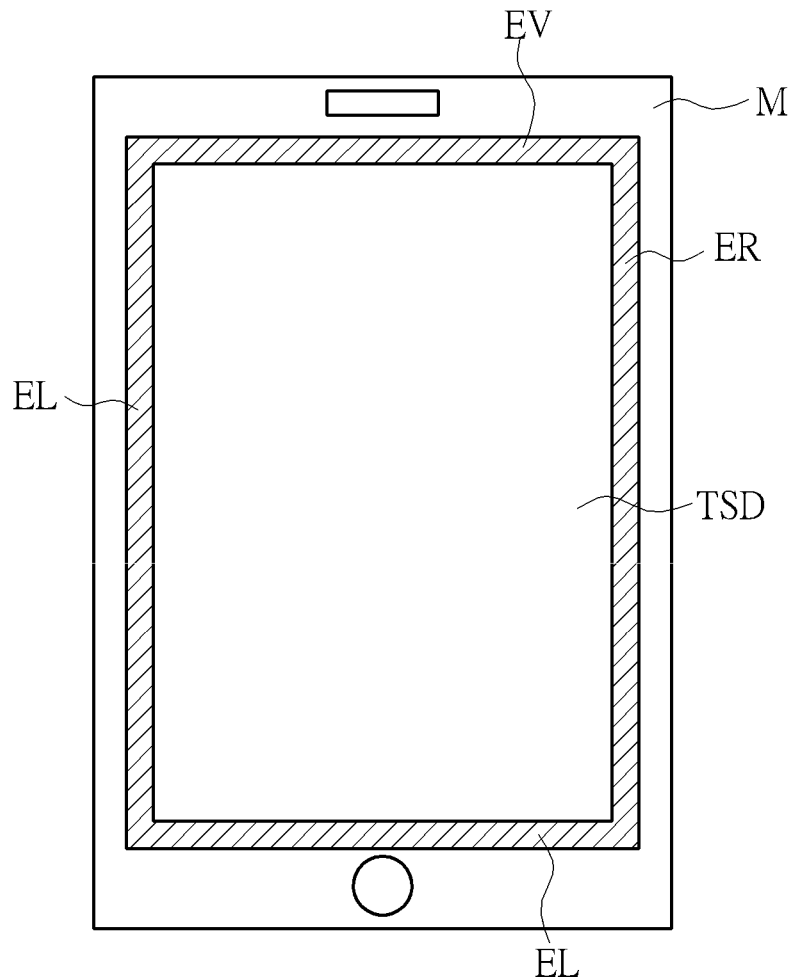
Figure 19:
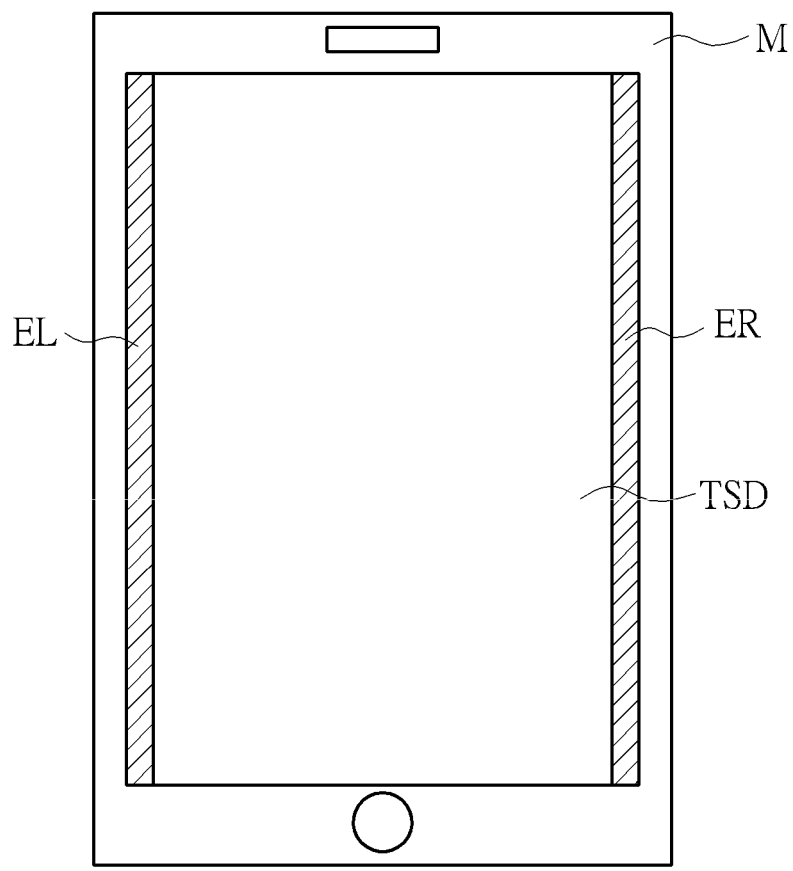
Figure 20:
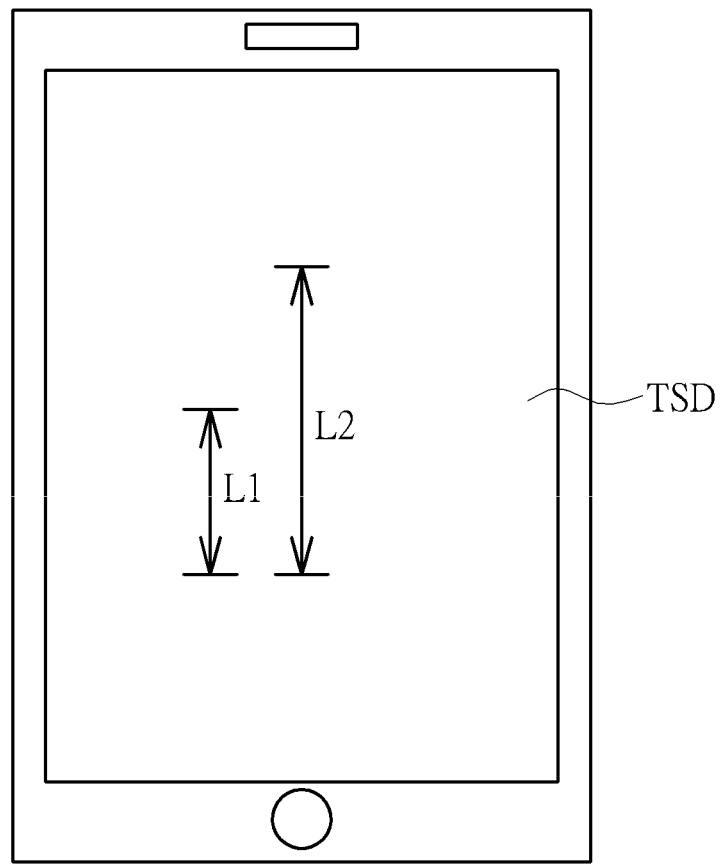

For still another example, if the position of the touch input is within a predetermined edge area of the touch sensing device TSD of the mobile phone M, the touch input is determined to be invalid and thus ignored. In one example, the predetermined edge area of the touch sensing device TSD of the mobile phone M comprises, as shown in FIG. 18, an upper edge EU, a lower edge EL, a left edge EL, or a right edge ER of the touch sensing device of the mobile phone M Please note, the edge number, location, and size are not limited to the embodiment illustrated in FIG. 18. In another example, as shown in FIG. 19, the predetermined edge area of the touch sensing device TSD of the mobile phone M only comprises a left edge EL and a right edge ER of the touch sensing device TSD of the mobile phone M.

For another example, a touch input detected is determined to be invalid and thus ignored if a swiping length of the touch input is smaller than a pre-defined swiping length threshold (i.e. a predetermined value), such as 3 cm. In preferred examples, the pre-defined swiping length threshold is a value in the range of 2.5-3.5 cm.

Figure 21:
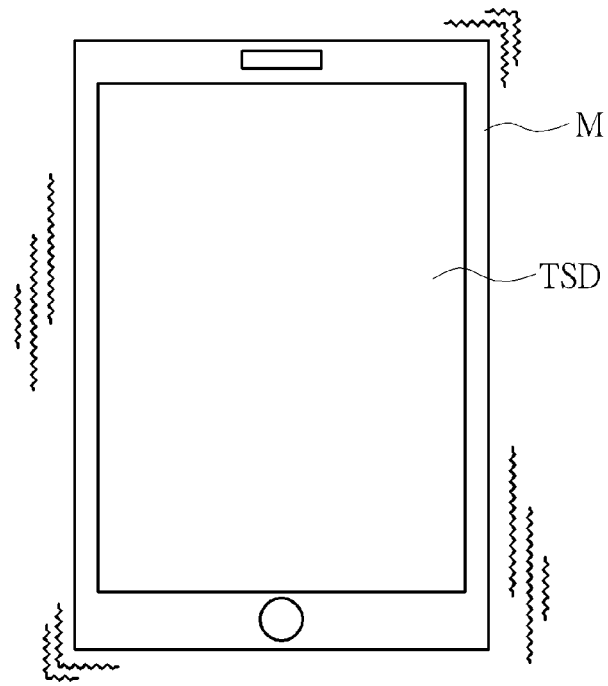
FIG. 21 is a schematic diagram illustrating an example for notifying the user that the gesture successively triggers the mobile phone.
Figure 21:
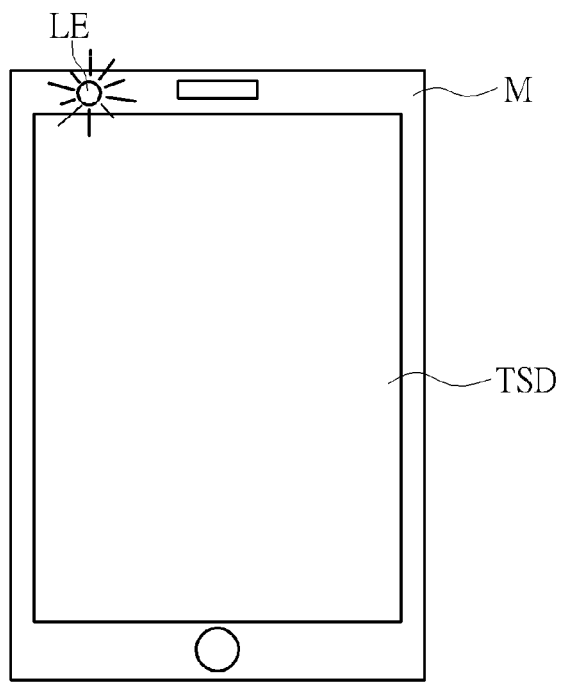

If the touch input is defined as a valid touch input after the above-mentioned check steps, then the mobile phone M is triggered to perform a function based on the valid touch input, as shown in the step 1105 of FIG. 11. FIG. 21 is a schematic diagram illustrating examples for notifying the user that the touch input successively triggers the mobile phone. As shown in FIG. 21(*a*), the mobile phone M vibrates if the valid touch input successively triggers it. Or, as shown in FIG. 21(*b*), a led LE of the mobile phone M illuminates, to notify the user that the valid touch input successively triggers the mobile phone M. However, please note the notifying operation is not limited to the examples of FIG. 21(*a*) and FIG. 21(*b*).

Figure 22:
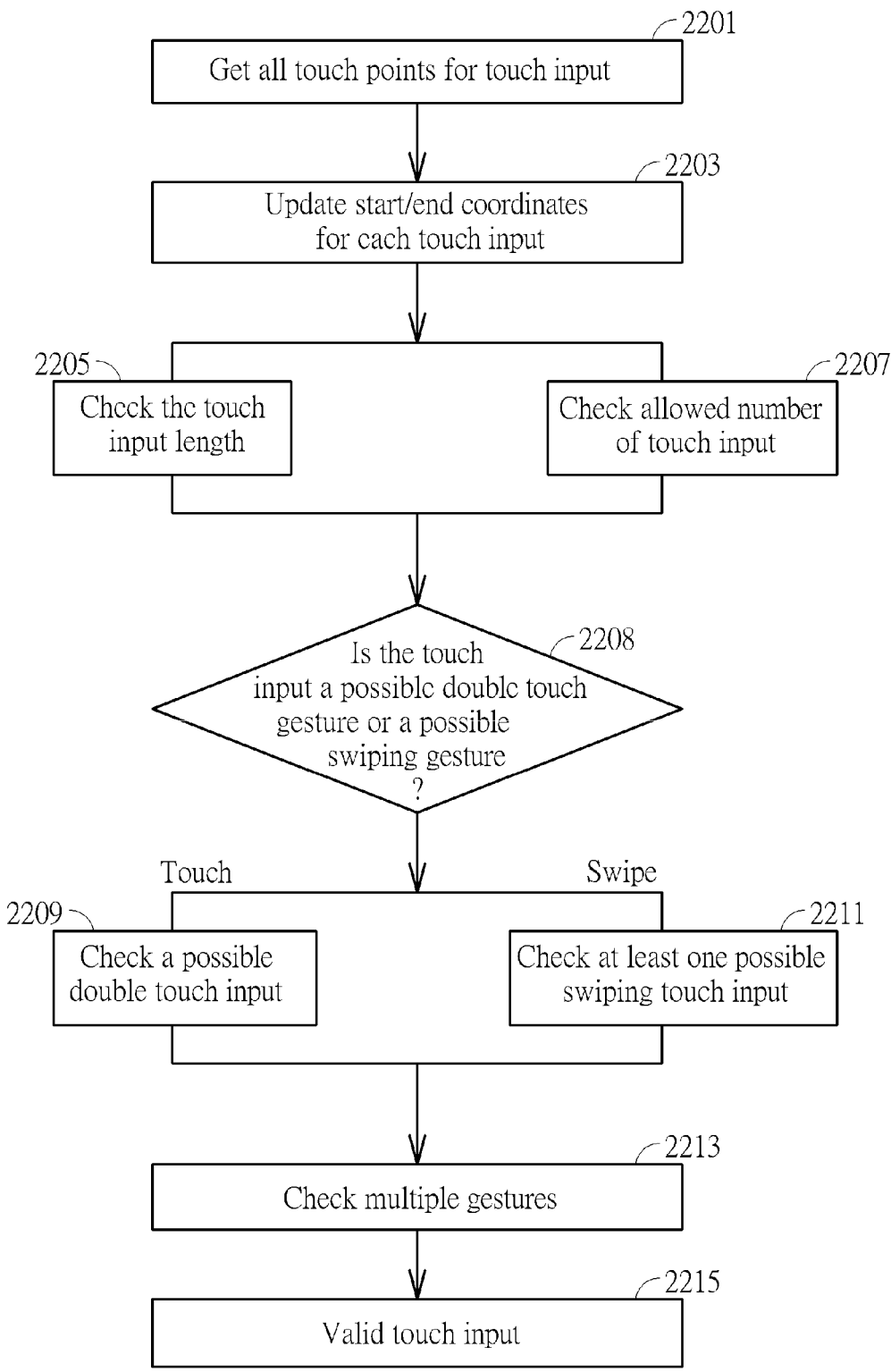
FIG. 22 is a flow chart illustrating an example for determining whether the user input is valid or not.

The situations illustrated in FIG. 12-21 can be detected one by one. Alternatively, the detection for the situations illustrated in FIG. 12-21 can be detected following a specific sequence. FIG. 22 is a flow chart illustrating an example for determining whether the user input is valid or not. It will be appreciated that the example in FIG. 22 does not mean to limit the scope of the present application.

The flow chart in FIG. 22 comprises:

Step 2201

Get all touch points for touch inputs. For example, if a touch input is provided to the mobile phone M, the touch points are all acquired in the step 2301.

Step 2203

Update start/end coordinates for each touch input.

Step 2205

Check the touch input length. In one embodiment, if the touch input has a length larger than a length threshold (i.e. a predetermined value), a notify message such as a vibration of the mobile phone can be provided.

Step 2207

Check allowed number of touch inputs. Please note, the allowed touch input here is not the valid touch input yet, since the allowed touch input still needed to be further checked by the steps 2205, 2209, 2211, 2213. However, if the steps 2209, 2211, 2213 do not exist, the allowed touch inputs can be regarded as the above-mentioned valid touch inputs.

In one embodiment, the step 2207 checks the number for touch inputs, and ignores the touch inputs if the number for touch inputs is more than a predetermined number. For example, if the number for the touch inputs is larger than 3, such as shown in FIG. 15, the touch inputs are ignored. On the contrary if the number for touch inputs is less than a predetermined number, the touch inputs can enter the other check steps.

Please note the order for steps 2205 and 2207 is not limited. For example the step 2205 can be firstly performed and then the step 2207 is performed. Or, the step 2207 can be firstly performed and then the step 2205 is performed.

Step 2208

Determine if the touch input is a possible double touch gesture or a possible swiping gesture. If the touch input is determined as a possible double touch gesture, go to step 2309, if the touch input is determined as a possible swiping gesture, go to step 2311. Many methods can be applied to implement the step 2308. For example, the coordinates of the touch input can be computed to determine if the touch input is a possible double touch gesture or a possible swiping gesture. In another example, it is detected if the finger leaves the mobile phone, to determine if the touch input is a possible double tap gesture.

In one example, if the touch input has a length smaller than a length threshold (ex. 3 cm) and the finger leaves the mobile phone, the gesture is determined as a possible tap gesture. In another example, if the touch input has a length longer than a predetermined value, it is determined as a possible swiping gesture.

In one embodiment, the possible touch gesture is a possible tap gesture, and the operation for tapping the mobile phone for several times can be determined if this is a possible double tap gesture or not according to the distances between the taps. If a distance between the two possible tap gestures is too long, the two possible tap gestures do not form a possible double tap gesture.

Also, the operation for tapping the mobile phone for two times can be determined if these possible tap gestures form a possible double tap gesture or not according to the time period between two taps.

In another embodiment, if the time period between a first possible tap gesture and a second possible tap gesture is too long, the first possible tap gesture and a second possible tap gesture are not determined as a possible double tap gesture. Then the time period between the second possible tap gesture and a third possible tap gesture (if the third possible tap gesture exists) is computed to determine if the second possible tap gesture and the third possible tap gesture is a possible double tap gesture.

Step 2209

Check a possible double touch gesture. The step 2209 can comprise at least one following steps: check single touch time out (ex. the user holds the mobile phone and keeps touching the mobile phone M, as illustrated in FIG. 13), check double-touch time out (ex. similar with FIG. 13 but the user touches two positions), check the touch region for the possible double touch gesture to avoid edges, as shown in FIG. 18 and FIG. 19. In one example, if a possible double touché is checked, the same point is checked. Also, it can further check if the palm touch exists or not, as shown in FIG. 12, to determine if the possible double touch gesture is valid.

Step 2211

Check at least one possible swiping gesture. The step 2311 can comprise at least one following steps: Check time out situation (as shown in FIG. 14), check the locations that the possible swiping gesture is performed to avoid edges (as shown in FIG. 18, FIG. 19). Also, it can further check if the palm touch exists or not, as shown in FIG. 12, to determine if the possible swiping gesture is valid.

Step 2213

Check multiple gestures. In one embodiment, if the number for the touch input (s) is more than two, the touch input (s) is ignored, but not limited.

Step 2215

If the touch input (s) can pass the check steps of steps 2205, 2207, 2209, 2211 and 2213, then determined as valid gestures.

Figure 23:
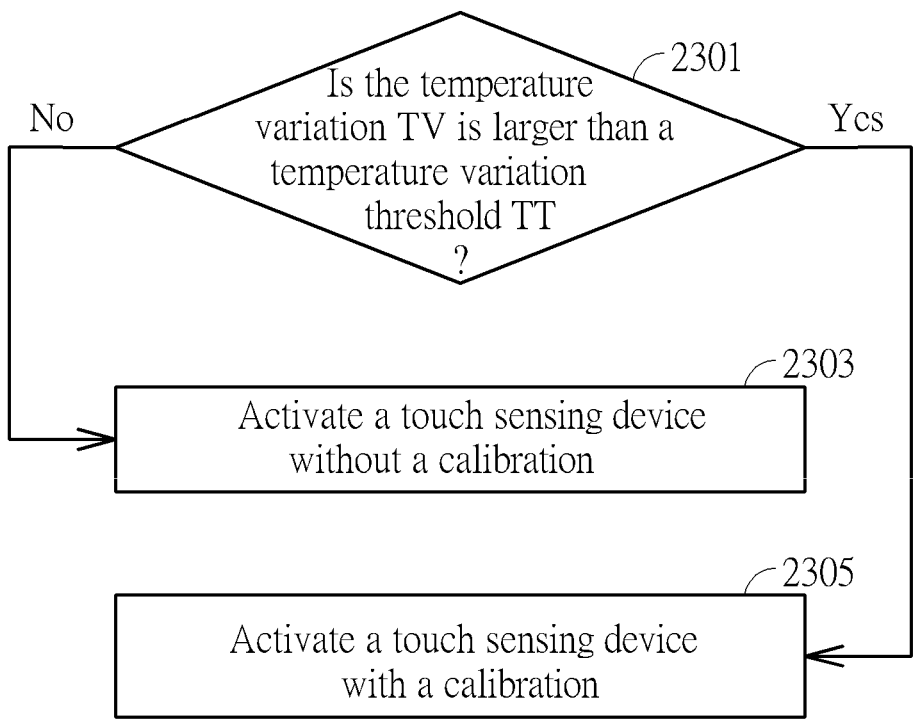
FIG. 23 is a flow chart illustrating a method for controlling an electronic apparatus, according to one embodiment of the present invention.

FIG. 23 is a flow chart illustrating a method for controlling an electronic apparatus, according to one embodiment of the present invention. The method for controlling an electronic apparatus in FIG. 23 comprises the following steps:

Step 2301

Determine if the temperature variation TV is larger than a temperature variation threshold TT (ex. 3°). If not, enter the step 2303, and if yes, enter the step 2305.

Step 2303

Activate a touch sensing device without a calibration.

Step 2305

Activate a touch sensing device with a calibration.

In one embodiment, the mobile phone detects the temperature for every period of time, and a register is provided in the mobile phone to record the temperature variation. For example, if the temperature changes from 25° to 29°, the register records a value 1. If the touch sensing device is activated and the value of the register is 1, the touch sensing level is calibrated. On the contrary, if the touch sensing device is activated and the value of the register is 0, which means the temperature variation is less than the temperature variation threshold TT, the touch sensing level is not needed to be calibrated.

In another embodiment, if the temperature changes from 25° to 29°, the register records a value 1. However, if the temperature changes from 29° back to 25°, the register is reset to a value 0.

The characteristic for the device in the mobile phone (ex. current, voltage) may change due to temperature variation, thus the touch sensing level may needed to be calibrated only if the temperature variation is large but not needed for each time that the touch sensing device is activated. By this way, the touch sensing can still be accurate without detecting the miss gestures. In view of above-mentioned embodiments, a user can active the electronic apparatus without pressing any hardware button, thus the breaking of the hardware button can be avoided. Additionally, the power consumption can be reduced since the activating time period for the main controller and the on time period for the display are dramatically reduced. Also, a protection mechanism can be provided to avoid wrongly trigger the electronic apparatus. Furthermore, the touch sensing level calibration can be triggered only when the temperature variation is large, thus the power can be saved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch input determining method applied to an electronic apparatus with a main controller for performing a predetermined function based on at least one touch input, a sub-controller for computing a tilt angle of the electronic apparatus, an environment sensing device, a touch sensing device and a display, wherein the method is performed when the main controller is in a sleep mode, the display is off and the touch sensing device is off, comprising:

applying the sub-controller to compute the tilt angle of the electronic apparatus according to an environment parameter received from the environment sensing device while the main controller is in the sleep mode;

applying the sub-controller used to compute the tilt angle to activate the touch sensing device without turning on the display if the tilt angle falls in a predetermined angle range, while the main controller is in a sleep mode;

determining a size of a region on the touch sensing device that an object provides the at least one touch input to;

keeping the display off if the sub-controller determines the size is larger than a first predetermined value or if the sub-controller determines the size is smaller than a second predetermined value, wherein the second predetermined value is smaller than the first predetermined value; and the sub-controller waking the main controller from the sleep mode and activating the main controller to turn on the display and to control the electronic apparatus to perform the predetermined function according to a gesture formed by the touch input if the size is smaller than the first predetermined value and larger than the second predetermined value.

2. The touch input determining method of claim 1, further comprising:

determining a distance between two of the touch inputs; and not determining the two of the touch inputs are valid touch inputs if the distance is larger than or equals to a third predetermined value.

3. The touch input determining method of claim 2, further comprising:

determining a position of the touch sensing device that the object provides the touch input to; and not determining the touch input is a valid touch input if the position is in a predetermined edge area of the touch sensing device.

4. The touch input determining method of claim 3, further comprising:

determining at least one total touch time period for the touch input; and not determining the touch input is a valid touch input if the total touch time period is larger or equals to a fourth predetermined value.

5. The touch input determining method of claim 4, further comprising:

determining if the touch input form a possible double touch input or a possible swipe touch input; and determining if the touch input is a valid touch input according to which one of the possible double touch input or the possible swipe touch input does the touch input form.

6. The touch input determining method of claim 5, further comprising:

determining a number of the touch inputs; and not determining the touch inputs are valid touch inputs if the number is larger or equals to a fifth predetermined value.

7. The touch input determining method of claim 6, further comprising:

determining a touch input length of the touch input; and not determining the touch input is a valid touch input if the touch input length is larger than or equals to a sixth predetermined value.

8. The touch input determining method of claim 7, wherein the step of determining a number of the touch inputs and the step of not determining the touch inputs are valid touch inputs if the number is larger or equals to a fifth predetermined value are performed before the step of determining a touch input length of the touch input and the step of not determining the touch input is a valid touch input if the touch input length is larger than or equals to a sixth predetermined value.

9. The touch input determining method of claim 8, wherein the touch input determining method further comprises:
    detecting a temperature variation of the touch sensing device; and
    determining if the touch sensing device should activate with a calibration for a touch sensing level or not according to the temperature variation.

10. The touch input determining method of claim 1, wherein the touch input forms a gesture which slides from down to top, and the predetermined function is: the display is turned on and the electronic apparatus backs to a home scene.

11. The touch input determining method of claim 1, wherein the touch input forms a gesture which slides from right to left, and the predetermined function is: the display is turned on and the electronic apparatus launches a dialer program.

12. The touch input determining method of claim 1, wherein the touch input forms a gesture which slides from left to right, and the predetermined function is: the display is turned on and the electronic apparatus launches a web browser program.

13. The touch input determining method of claim 1, wherein the touch input forms a gesture which continuously taps, and the predetermined function is: the display is turned on.

14. An electronic apparatus with a touch input determining mechanism, comprising:
    an environment sensing device;
    a display;
    a touch sensing device; and
    a processing module, comprising:
    a main controller, configured to perform a predetermined function based on at least one touch input;
    a sub-controller, configured to compute a tilt angle of the electronic apparatus according to an environment parameter received from the environment sensing device while the main controller is in a sleep mode, and configured to compute the tilt angle to activate the touch sensing device without turning on the display if the tilt angle falls in a predetermined angle range, while the main controller is in the sleep mode;
    wherein the processing module is further configured to perform following steps when the display is off:
    determining a size of a region on the touch sensing device that an object provides the at least one touch input to;
    wherein the processing module keeps the display off if the sub-controller determines the size is larger than a first predetermined value or if the sub-controller determines the size is smaller than a second predetermined value, wherein the second predetermined value is smaller than the first predetermined value;
    wherein the sub-controller wakes the main controller from the sleep mode and activates the main controller to turn on the display and to control the electronic apparatus to perform the predetermined function according to a gesture formed by the touch input if the size is smaller than the first predetermined value and larger than the second predetermined value.

15. The electronic apparatus of claim 14, wherein processing module is further configured to perform following steps:
    determining a distance between two of the touch inputs; and
    not determining the touch inputs are valid touch inputs if the distance is larger than a third predetermined value.

16. The electronic apparatus of claim 15, wherein the processing module is further configured to perform following steps:
    determining a position of the touch sensing device which the object provides the touch input to; and
    not determining the touch input is a valid touch input if the positions is in a predetermined edge area of the touch sensing device.

17. The electronic apparatus of claim 16, wherein the processing module is further configured to perform following steps:
    determining at least total touch time period for the touch input; and
    not determining the touch input is a valid touch input if the total touch time period is larger or equals to a fourth predetermined value.

18. The electronic apparatus of claim 17, wherein the processing module is further configured to perform following steps:
    determining if the touch input form a possible double touch input or a possible swipe touch input; and
    determining if the touch input is a valid touch input according to which one of the possible double touch input or the possible swipe touch input does the touch input form.

19. The electronic apparatus of claim 18, wherein the processing module is further configured to perform following steps:
    determining a number of the touch inputs; and
    not determining the touch inputs are valid touch inputs if the number is larger or equals to a predetermined number.

20. The electronic apparatus of claim 19, wherein the processing module is further configured to perform following steps:
    determining a touch input length of the touch input; and
    not determining the touch input is a valid touch input if the touch input length is larger than or equals to a fifth predetermined value.

21. The electronic apparatus of claim 20, wherein the processing module performs the step of determining a number of the touch inputs and the step of not determining the touch inputs are valid touch inputs if the number is larger or equals to a fifth predetermined value before the step of determining a touch input length of the touch input and the step of not determining the touch input is a valid touch input if the touch input length is larger than or equals to a fifth predetermined value.

22. The electronic apparatus of claim 21, wherein the processing module is further configured to perform following steps:
    detecting a temperature variation of the touch sensing device; and
    determining if the touch sensing device should activate with a calibration for a touch sensing level or not according to the temperature variation.

23. The electronic apparatus of claim 14, wherein the touch input forms a gesture which slides from down to top, and the predetermined function is: the display is turned on and the electronic apparatus backs to a home scene.

24. The electronic apparatus of claim 14, wherein the touch input forms a gesture which slides from right to left, and the predetermined function is: the display is turned on and the electronic apparatus launches a dialer program.

25. The electronic apparatus of claim 14, wherein the touch input forms a gesture which slides from left to right, and the predetermined function is: the display is turned on and the electronic apparatus launches a web browser program.

26. The electronic apparatus of claim 14, wherein the touch input forms a gesture which continuously taps, and the predetermined function is: the display is turned on.

* * * * *